(12) United States Patent
Porath et al.

(10) Patent No.: US 10,997,190 B2
(45) Date of Patent: May 4, 2021

(54) CONTEXT-ADAPTIVE SELECTION OPTIONS IN A MODULAR VISUALIZATION FRAMEWORK

(71) Applicant: Splunk Inc., San Francisco, CA (US)

(72) Inventors: Michael Porath, San Francisco, CA (US); Simon Foster Fishel, San Francisco, CA (US); Adam Jamison Oliner, San Francisco, CA (US); Clark Eugene Mullen, San Mateo, CA (US); Siegfried Puchbauer-Schnabel, San Francisco, CA (US); Marshall Chalmers Agnew, Seattle, WA (US)

(73) Assignee: SPLUNK INC., San Francisco, CA (US)

( * ) Notice: Subject to any disclaimer, the term of this patent is extended or adjusted under 35 U.S.C. 154(b) by 638 days.

(21) Appl. No.: 15/012,757

(22) Filed: Feb. 1, 2016

(65) Prior Publication Data

US 2017/0220633 A1 Aug. 3, 2017

(51) Int. Cl.
*G06F 16/24* (2019.01)
*G06F 16/248* (2019.01)
*G06F 9/54* (2006.01)
*G06F 9/451* (2018.01)

(52) U.S. Cl.
CPC ........... *G06F 16/248* (2019.01); *G06F 9/542* (2013.01); *G06F 9/452* (2018.02)

(58) Field of Classification Search
CPC ... G06G 16/248; G06F 16/156; G06F 16/338; G06F 16/838; G06F 16/9038; G06F 16/9538

See application file for complete search history.

(56) References Cited

U.S. PATENT DOCUMENTS

| | | | |
|---|---|---|---|
| 9,335,911 B1* | 5/2016 | Elliot | G06F 17/30572 |
| 9,779,147 B1* | 10/2017 | Sherman | G06F 16/248 |
| 2004/0252136 A1* | 12/2004 | Bhatt | G06T 11/206 345/619 |
| 2007/0299821 A1* | 12/2007 | McCully | G06F 16/248 |
| 2008/0180458 A1* | 7/2008 | Favart | G06F 9/455 345/630 |
| 2010/0199181 A1* | 8/2010 | Robertson | G06Q 30/02 715/709 |
| 2011/0040802 A1* | 2/2011 | Bonatti | G06F 16/116 707/803 |
| 2011/0066933 A1* | 3/2011 | Ludwig | G06F 17/246 715/212 |
| 2011/0292072 A1* | 12/2011 | Fisher | G06T 11/60 345/619 |

(Continued)

*Primary Examiner* — Alicia M Willoughby
(74) *Attorney, Agent, or Firm* — Perkins Coie LLP

(57) ABSTRACT

A modular visualization framework registers definitions for a variety of visualization types. The definitions are tagged with visualization characteristics. During a working session, likely interactive, a user identifies a search query used to produce data to be visualized. The working context, including the search query and data produced by its execution, is tagged for its visualization characteristics. Information about the working context, including its visualization characteristics, is then used to produce a customized list of candidates suited for the working context from which the user may select a visualization type.

30 Claims, 33 Drawing Sheets

(56) References Cited

U.S. PATENT DOCUMENTS

| | | | |
|---|---|---|---|
| 2013/0187926 A1* | 7/2013 | Silverstein | G06Q 10/105 |
| | | | 345/440 |
| 2013/0339382 A1* | 12/2013 | Puszkiewicz | G06F 16/2423 |
| | | | 707/769 |
| 2015/0006518 A1* | 1/2015 | Baumgartner | G06F 17/30554 |
| | | | 707/723 |
| 2015/0160835 A1* | 6/2015 | Singh | G06F 3/04842 |
| | | | 715/734 |
| 2015/0212663 A1* | 7/2015 | Papale | G06F 16/248 |
| | | | 715/762 |
| 2016/0012129 A1* | 1/2016 | Rampson | G06F 17/30864 |
| | | | 707/722 |
| 2016/0092408 A1* | 3/2016 | Lagerblad | G06F 3/04842 |
| | | | 715/243 |
| 2016/0124960 A1* | 5/2016 | Moser | G06T 11/206 |
| | | | 707/723 |
| 2016/0299827 A1* | 10/2016 | Wilkinson | G06F 11/323 |
| 2016/0371395 A1* | 12/2016 | Dumant | G06F 17/30973 |
| 2017/0116426 A1* | 4/2017 | Pattabhiraman | G06Q 10/10 |
| 2017/0118308 A1* | 4/2017 | Vigeant | H04W 4/50 |
| 2018/0061095 A1* | 3/2018 | Philippen | G06T 11/206 |
| 2018/0227192 A1* | 8/2018 | Jain | H04L 41/145 |
| 2019/0026084 A1* | 1/2019 | Elliot | G06F 11/3668 |
| 2020/0019546 A1* | 1/2020 | Luo | G06F 16/245 |

* cited by examiner

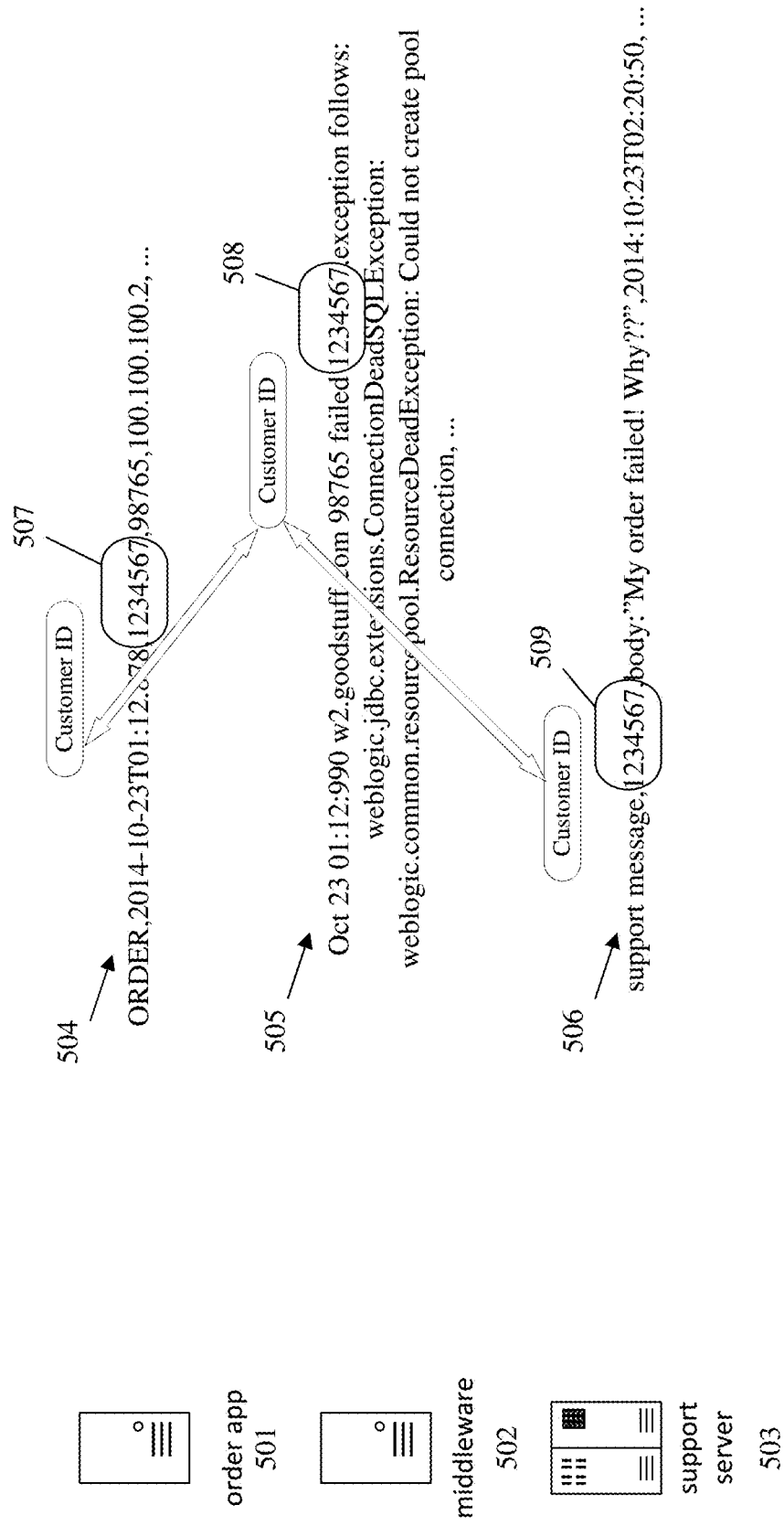

FIG. 6B

Original Search:
Search "error" | stats count BY host     802

Sent to peers:
Search "error" | prestats count BY host     804

Executed by search head:
Aggregate the prestats results received from peers     806

CONTEXT-ADAPTIVE SELECTION OPTIONS IN A MODULAR VISUALIZATION FRAMEWORK

TECHNICAL FIELD

The present disclosure is generally directed to data visualizations, and more particularly, to management of visualization types.

BACKGROUND

Information systems generate vast amounts and wide varieties of machine-generated data such as activity logs, error logs, configuration files, network messages, database records, etc. This machine-generated data may be difficult to understand or process without a visual representation for easier data consumption by users. Data visualizations may be used to clearly and efficiently communicate information to users. Examples of data visualizations may include tables, pie charts, column charts, time graphs, and the like. Effective visualization helps users in analyzing data, detecting operation trends, and measuring system performance. Data visualizations may make complex data more accessible, understandable and usable. Users may have particular analytical tasks, such as making comparisons or understanding causality.

BRIEF DESCRIPTION OF THE DRAWINGS

In the drawings:

FIG. 5 illustrates a scenario where a common customer ID is found among log data received from three disparate sources in accordance with the disclosed embodiments;

FIG. 6B illustrates a data summary dialog that enables a user to select various data sources in accordance with the disclosed embodiments;

FIGS. 12-14 illustrate a series of user interface screens for an example data model-driven report generation interface in accordance with the disclosed embodiments;

FIGS. 15-17 illustrate example visualizations generated by a reporting application in accordance with the disclosed embodiments;

DETAILED DESCRIPTION

Figure 1:
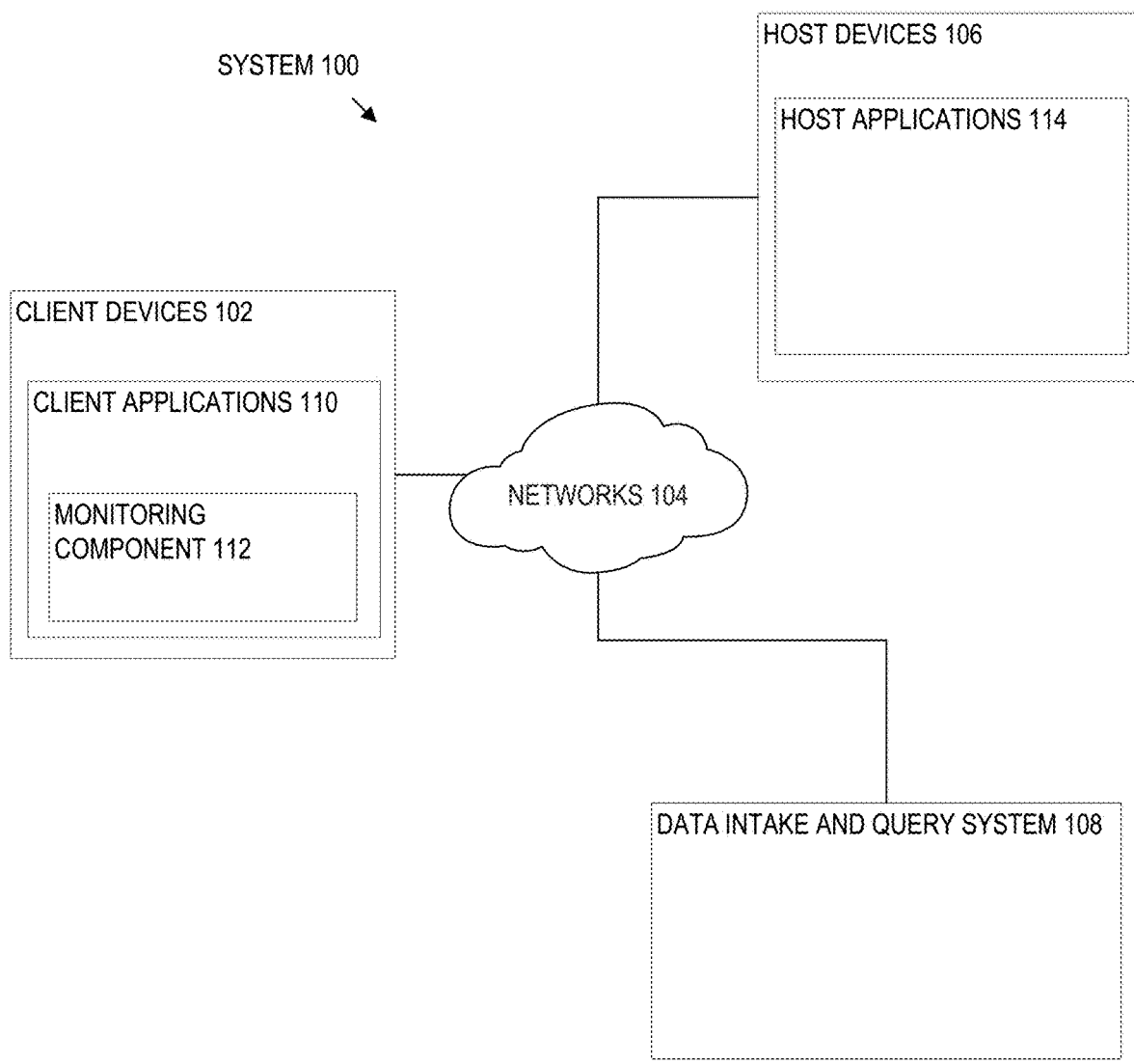
FIG. 1 illustrates a networked computer environment in which an embodiment may be implemented.

The present disclosure is directed to providing context-adapted visualization selection such as may be particularly useful in conjunction with a visualization framework, even a modular visualizations framework. As described herein, in some embodiments, a framework, application program, and/or website may provide for tagging visualization definitions with visualization characteristics. Visualization definitions may represent visualization types, such as a monochrome bar chart, or multi-colored exploded pie chart. An active user may specify a search query in his current working context which, too, may be tagged for its visualization characteristics. The visualization characteristics of the search query of the current working context, along with other factors, may be used to recommend a list of candidate visualization types from which the user can then efficiently make a selection. Other embodiments are also disclosed.

Throughout this description for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the described embodiments.

Embodiments are described herein according to the following outline:

1.0. General Overview
2.0. Operating Environment
  2.1. Host Devices
  2.2. Client Devices 2.3. Client Device Applications
2.4. Data Server System
2.5. Data Ingestion
   2.5.1. Input
   2.5.2. Parsing
   2.5.3. Indexing
2.6. Query Processing
2.7. Field Extraction
2.8. Example Search Screen
2.9. Data Modelling
2.10. Acceleration Techniques
   2.10.1. Aggregation Technique
   2.10.2. Keyword Index
   2.10.3. High Performance Analytics Store
   2.10.4. Accelerating Report Generation
2.11. Security Features
2.12. Data Center Monitoring
2.13. Cloud-Based System Overview
2.14. Searching Externally Archived Data
   2.14.1. ERP Process Features
3.0. Modular Visualizations
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various web sites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
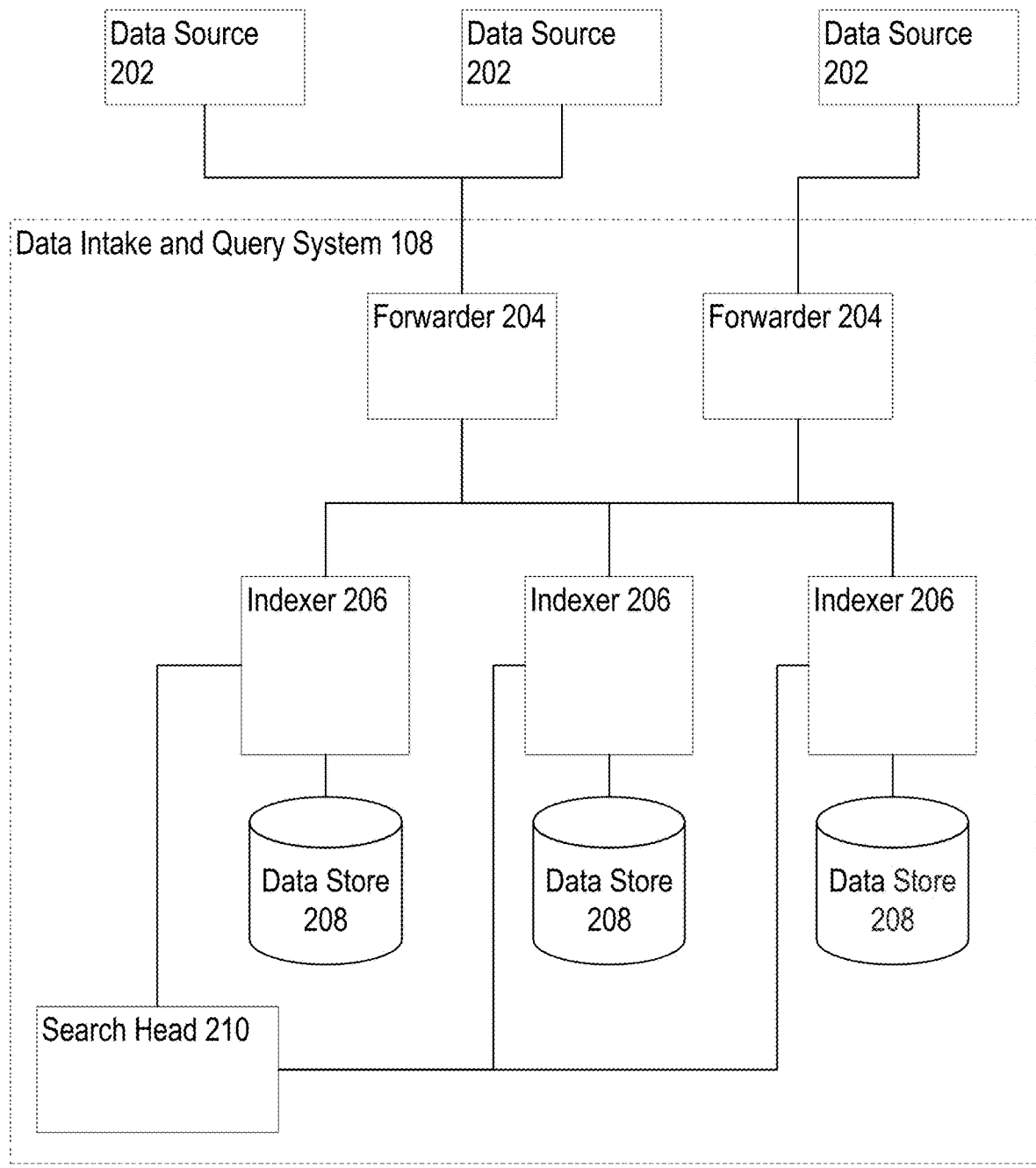
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
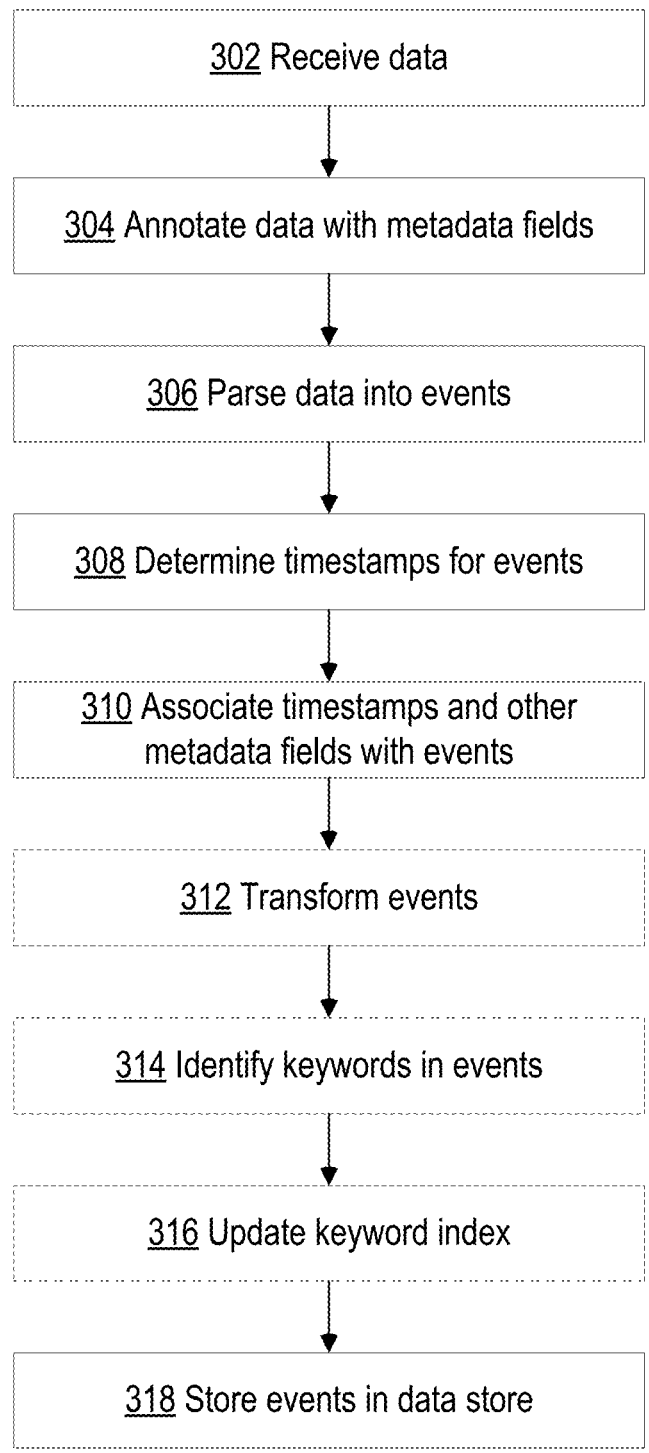
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING" also filed on 30 Apr. 2014, each of which is hereby incorporated by reference in its entirety for all purposes.

2.6. Query Processing

Figure 4:
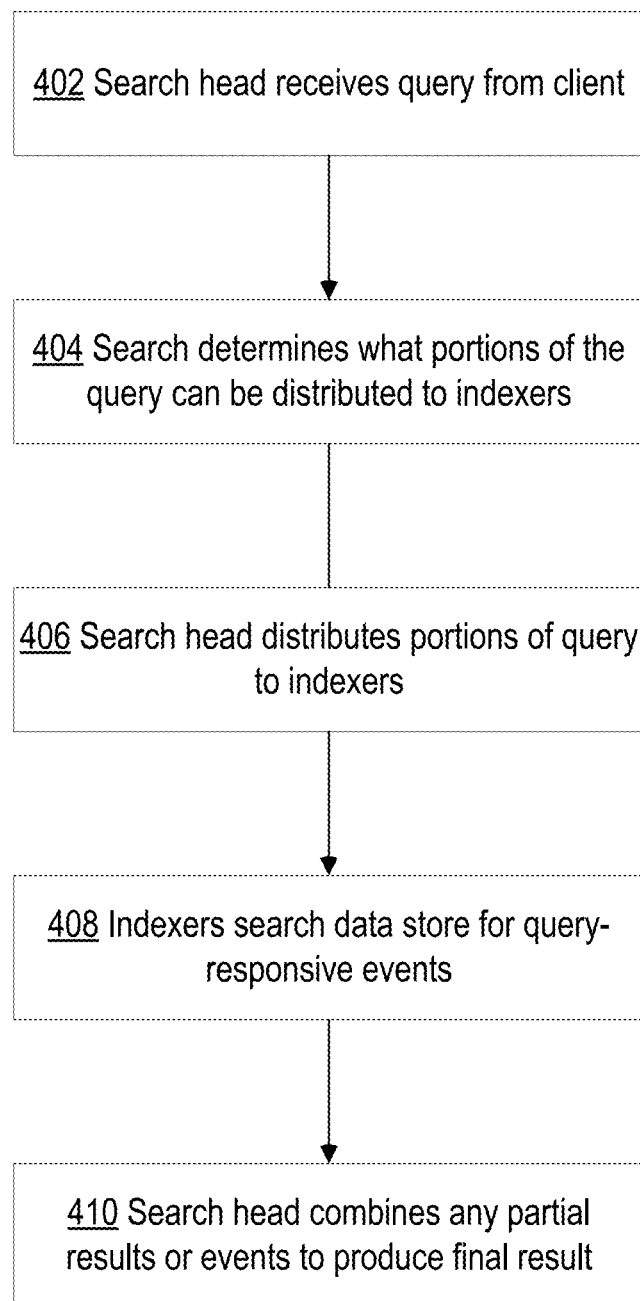
FIG. 4 is a flow diagram that illustrates how a search head and indexers perform a search query in accordance with the disclosed embodiments.

FIG. 4 is a flow diagram that illustrates an examplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
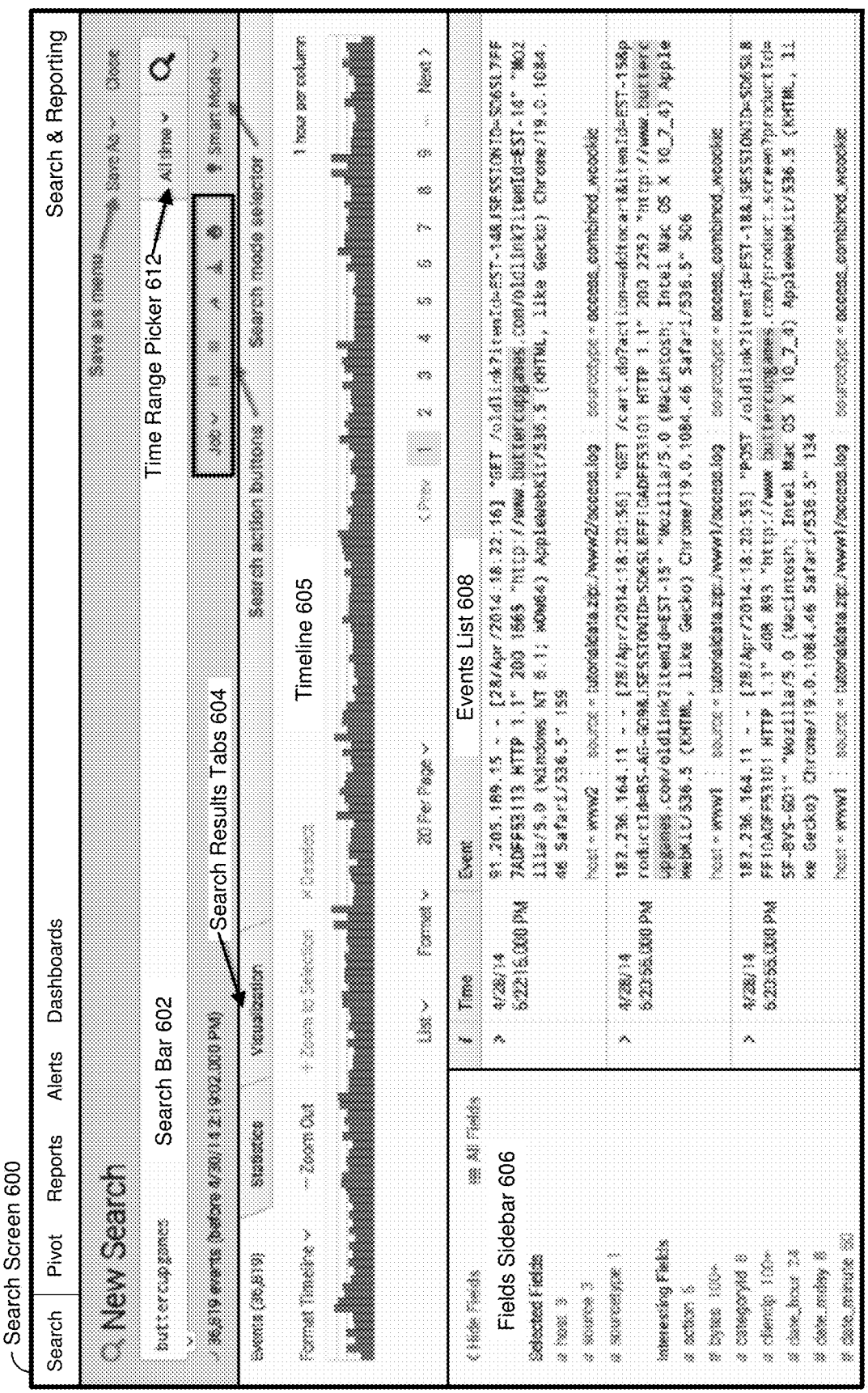
FIG. 6A illustrates a search screen in accordance with the disclosed embodiments.
Figure 6B:
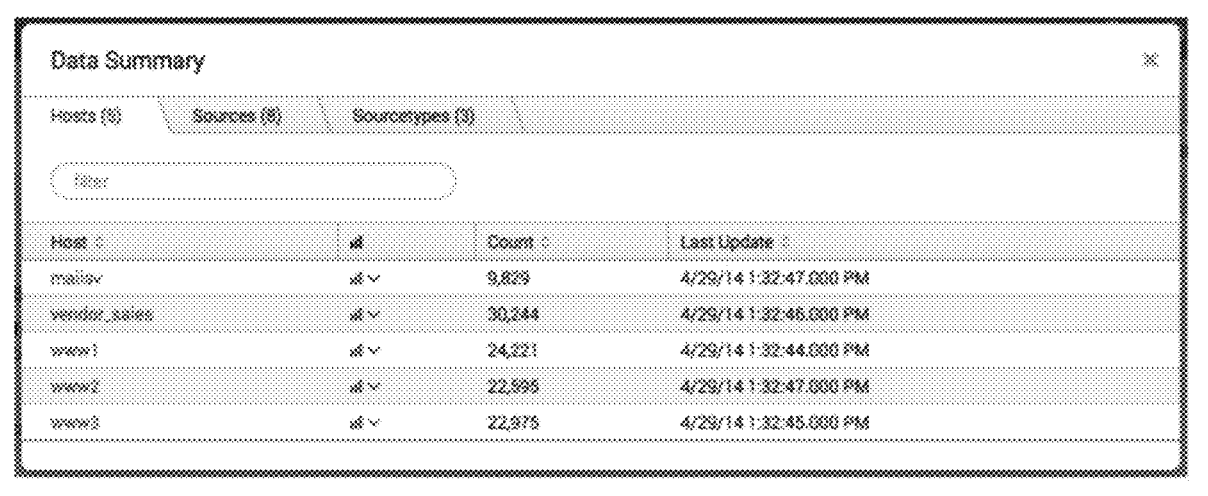

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
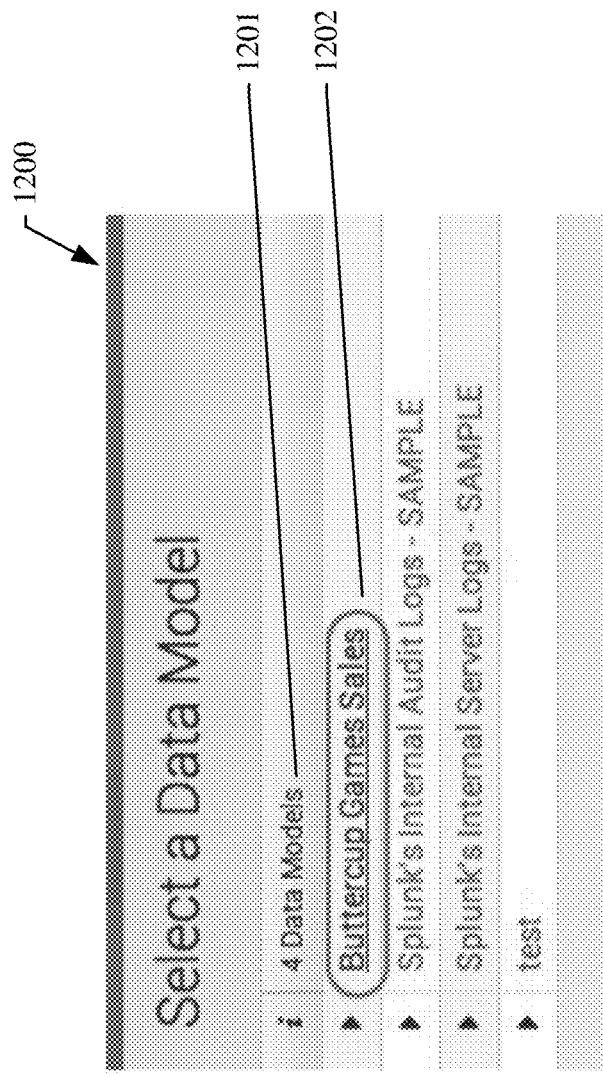

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
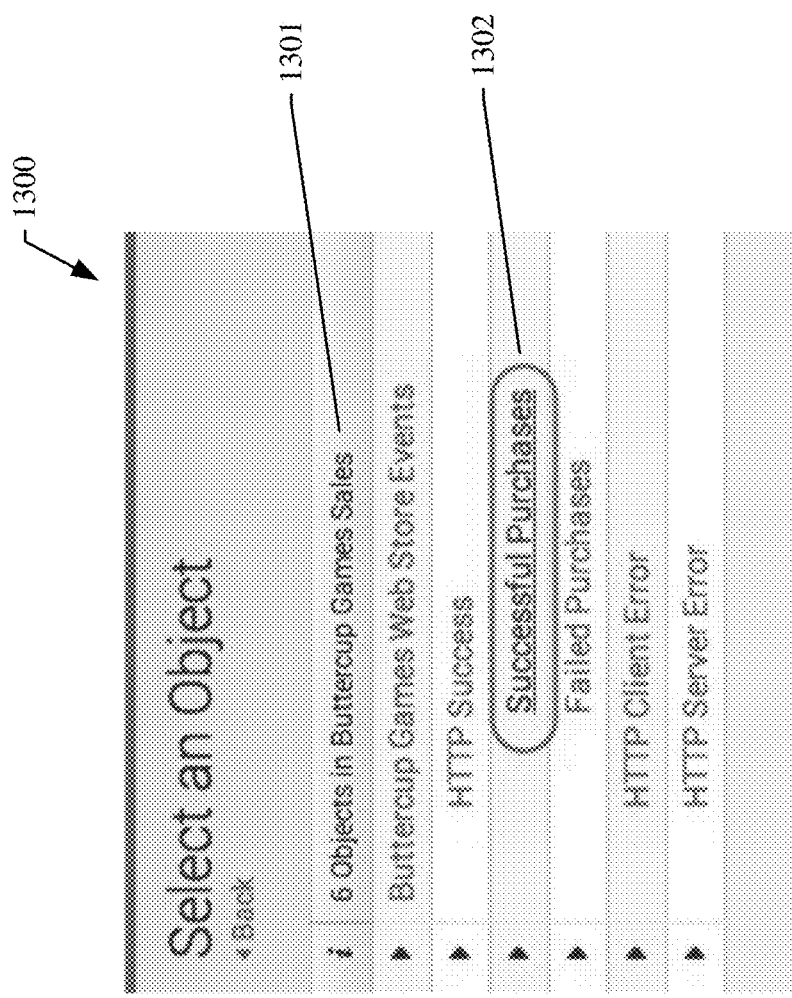

FIG. 13 illustrates an example data model object selection graphical user interface 1300 that displays available data objects 1301 for the selected data object model 1202. The user may select one of the displayed data model objects 1302 for use in driving the report generation process.

Figure 7A:
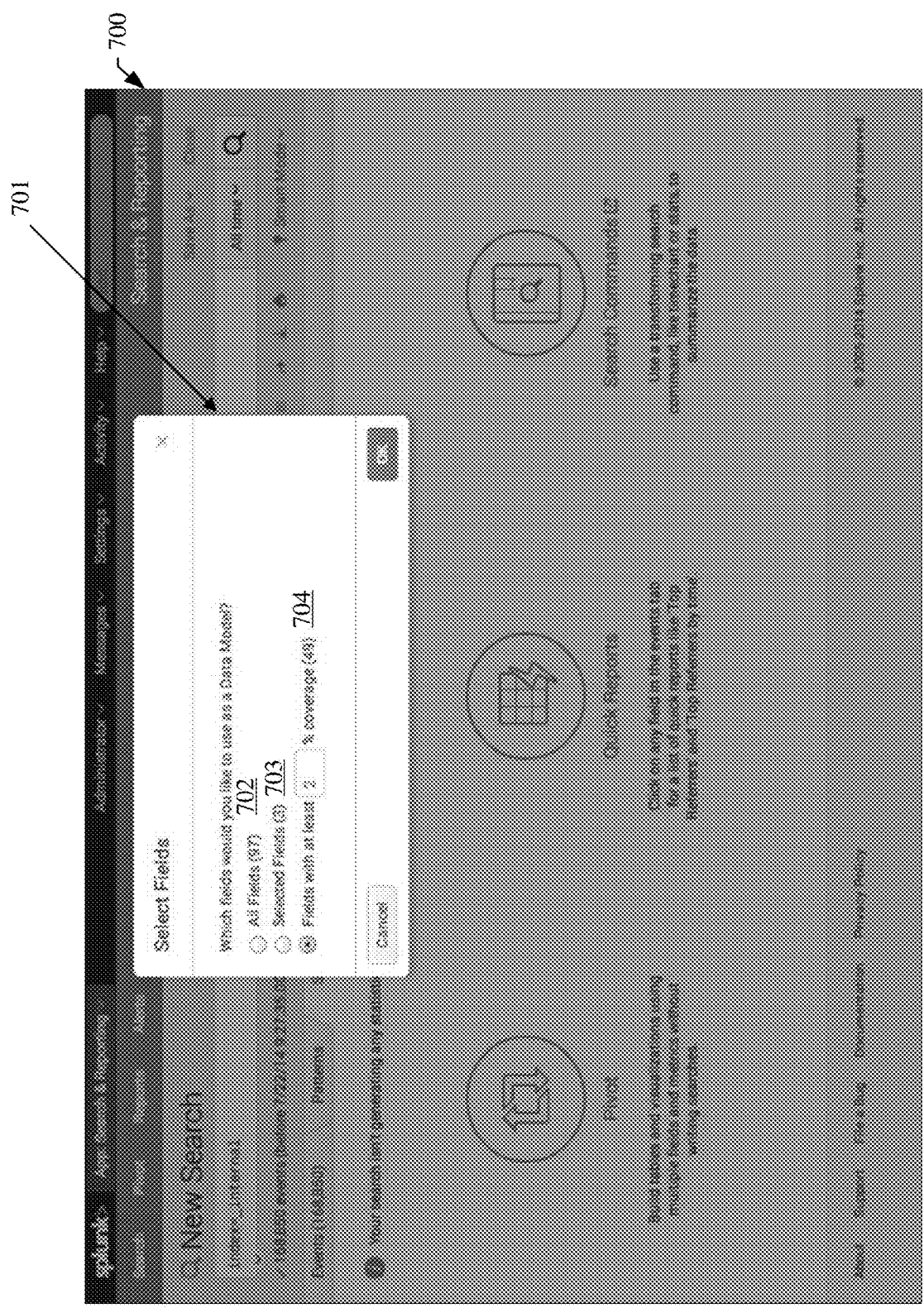
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
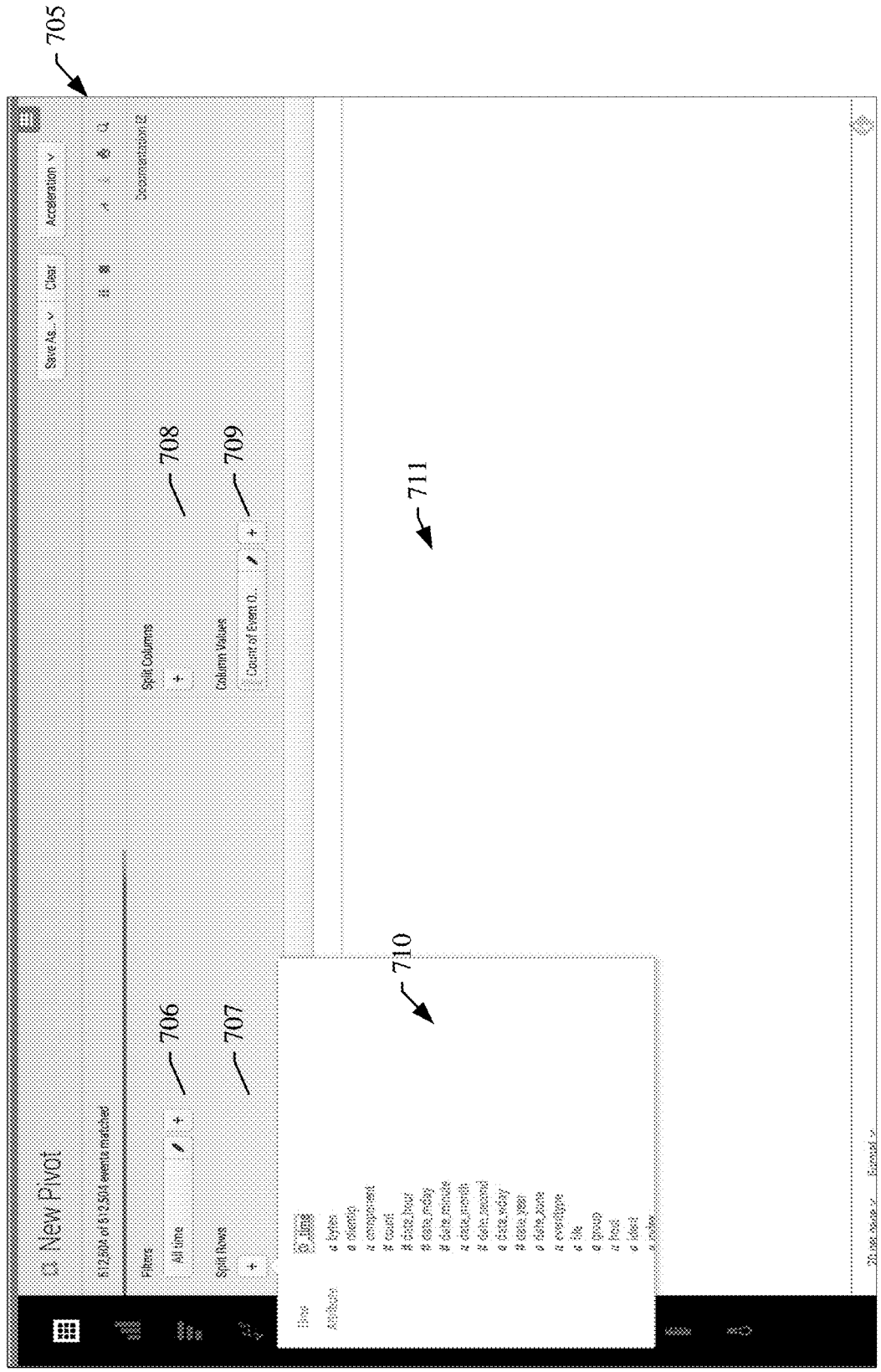
Figure 7C:
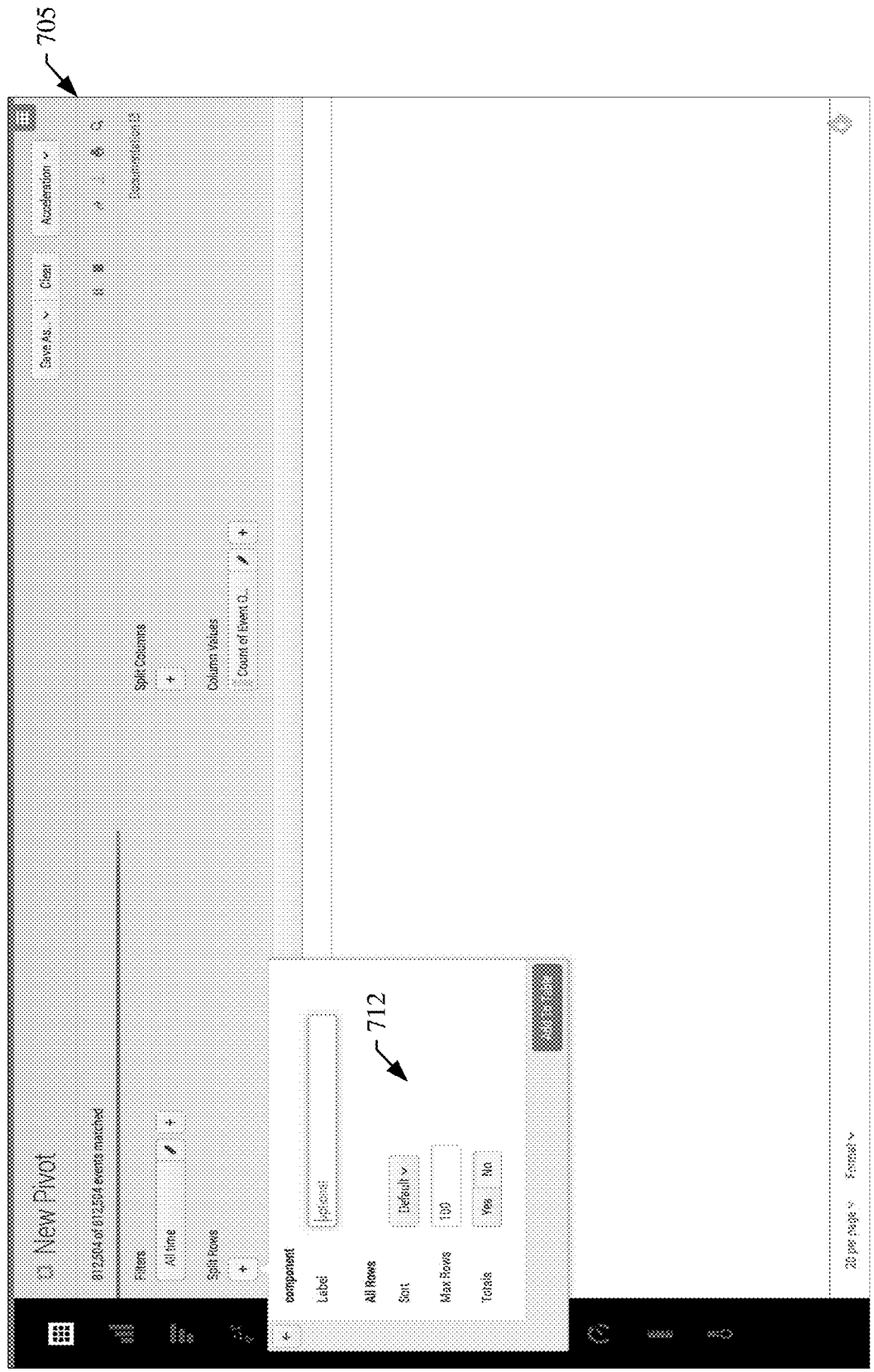

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
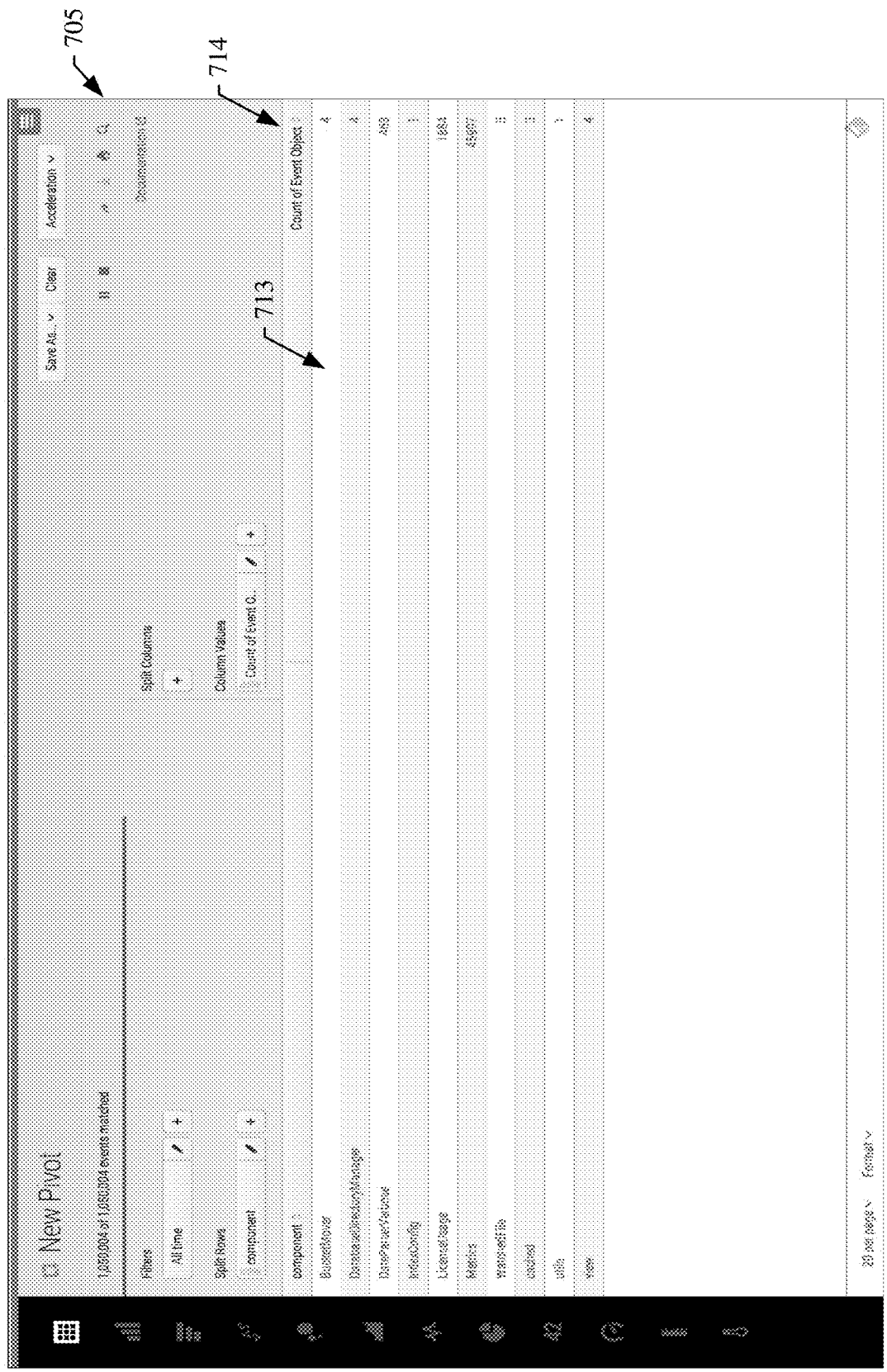

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:
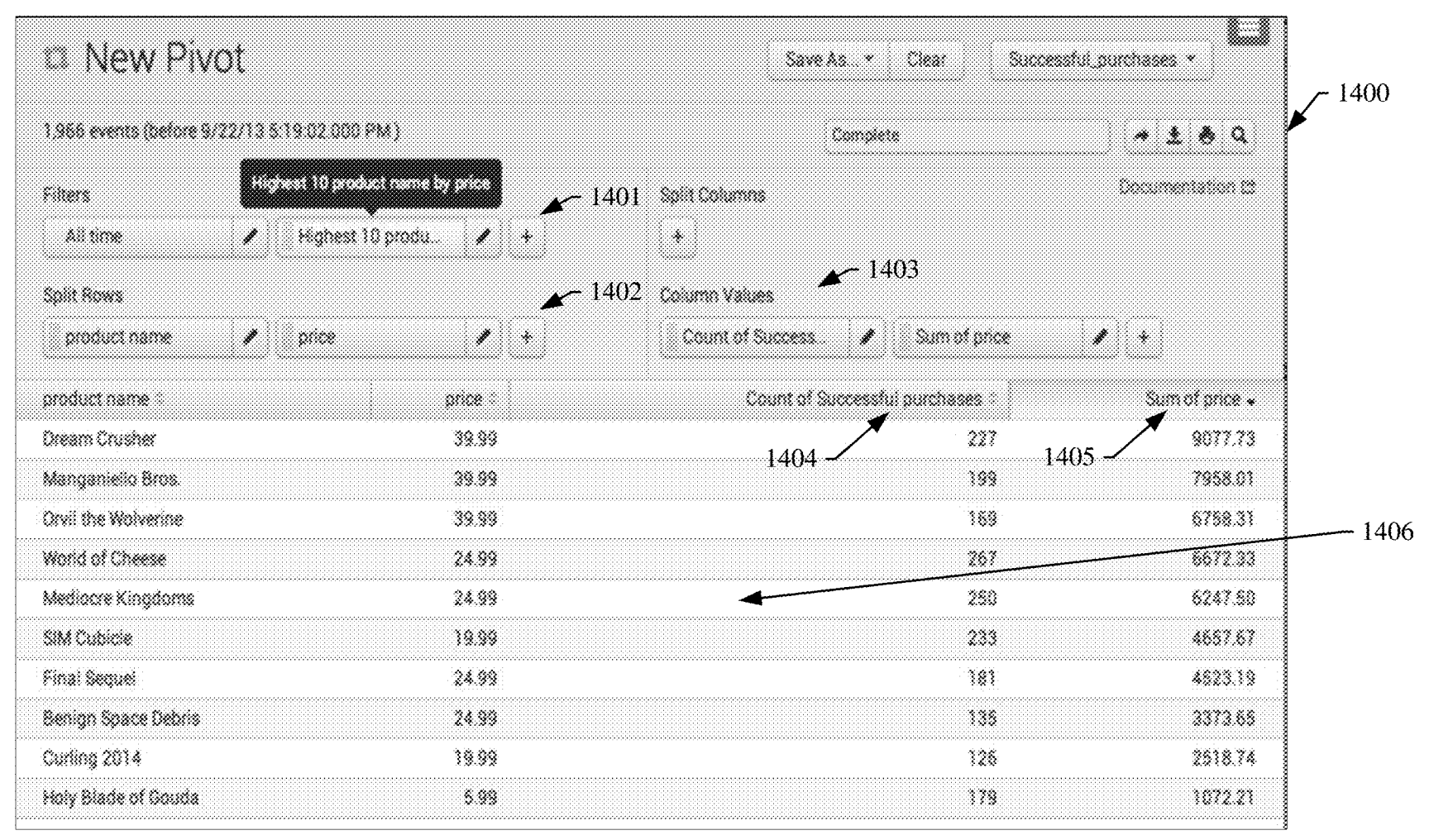

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
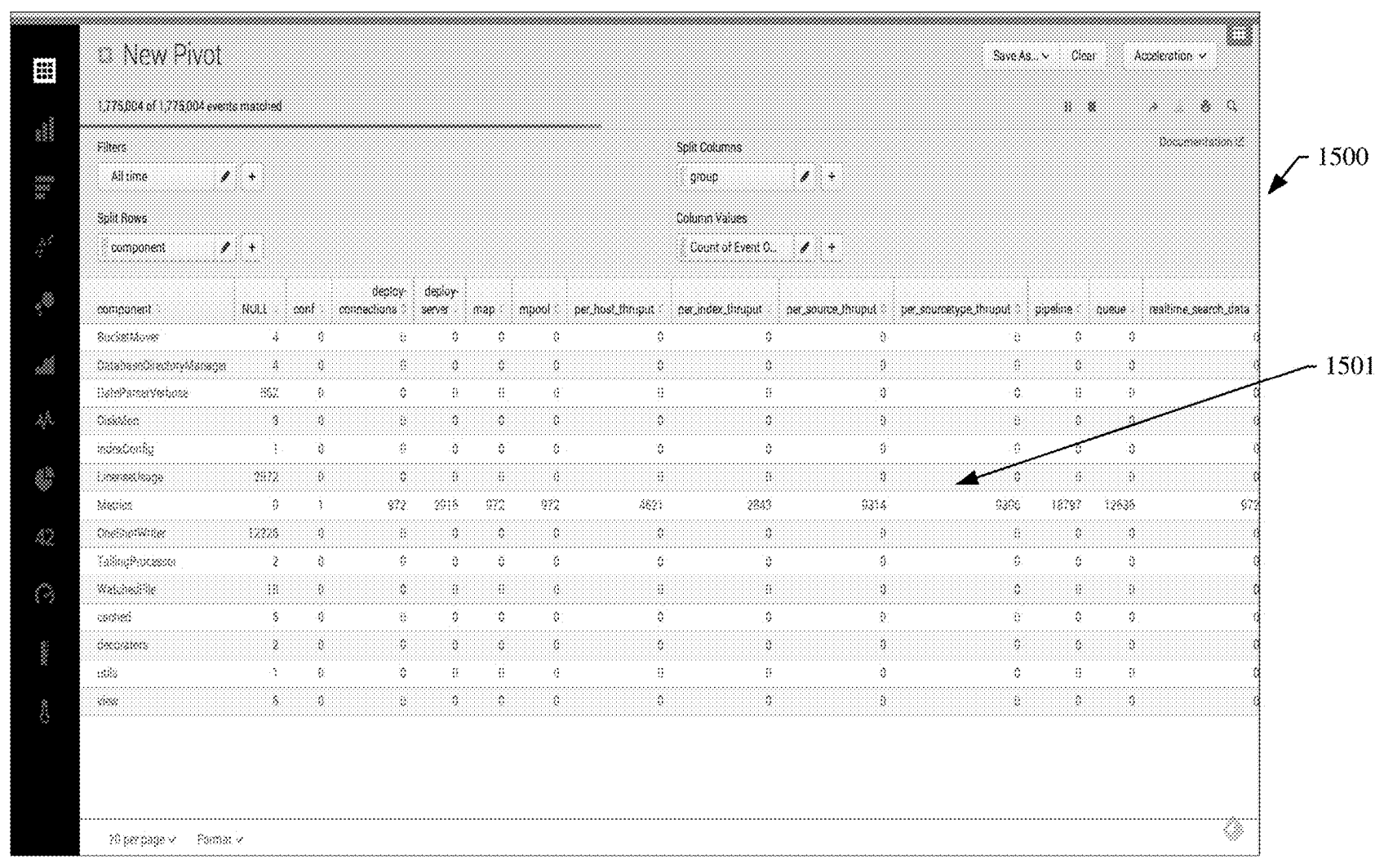
Figure 16:
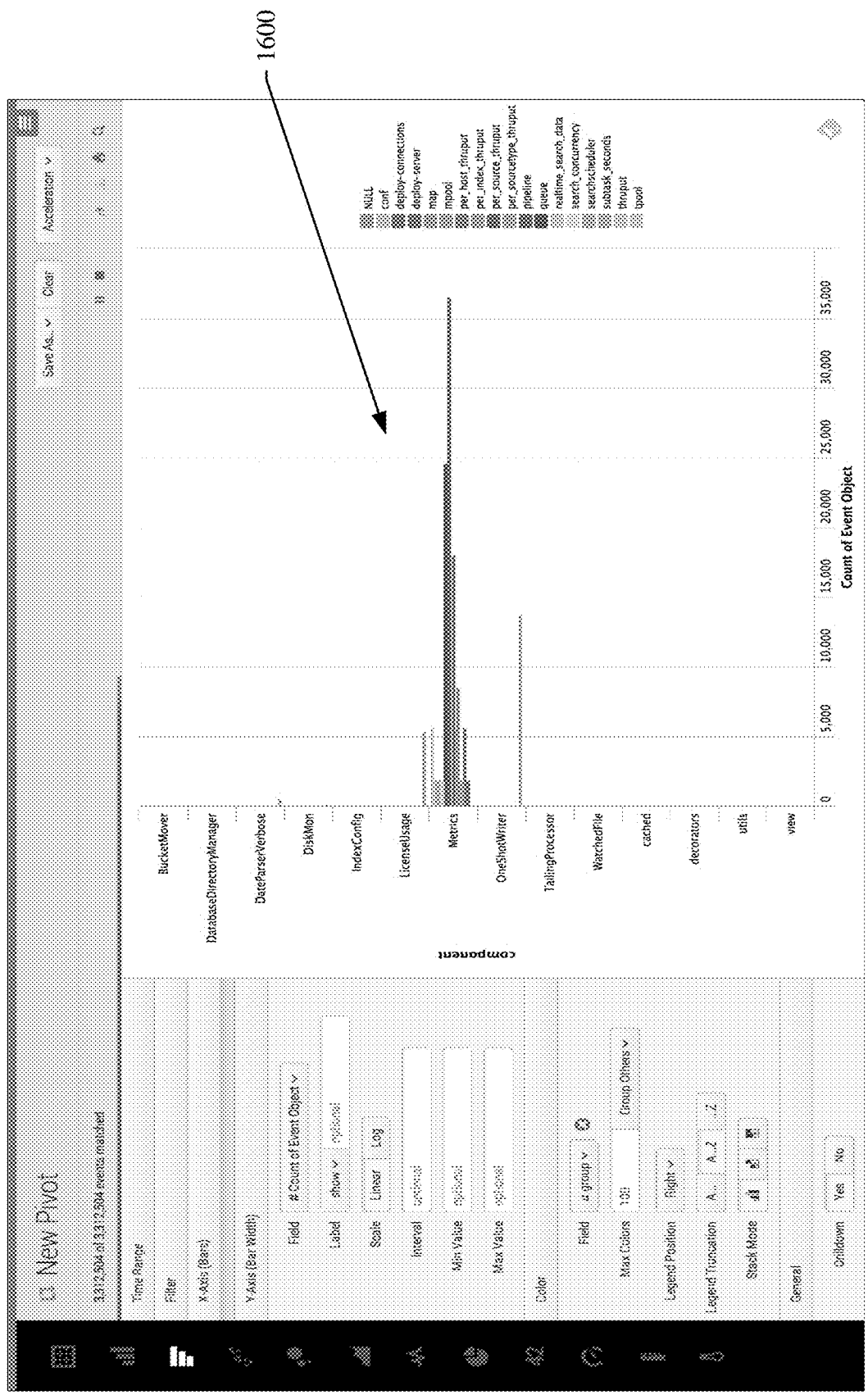
Figure 17:
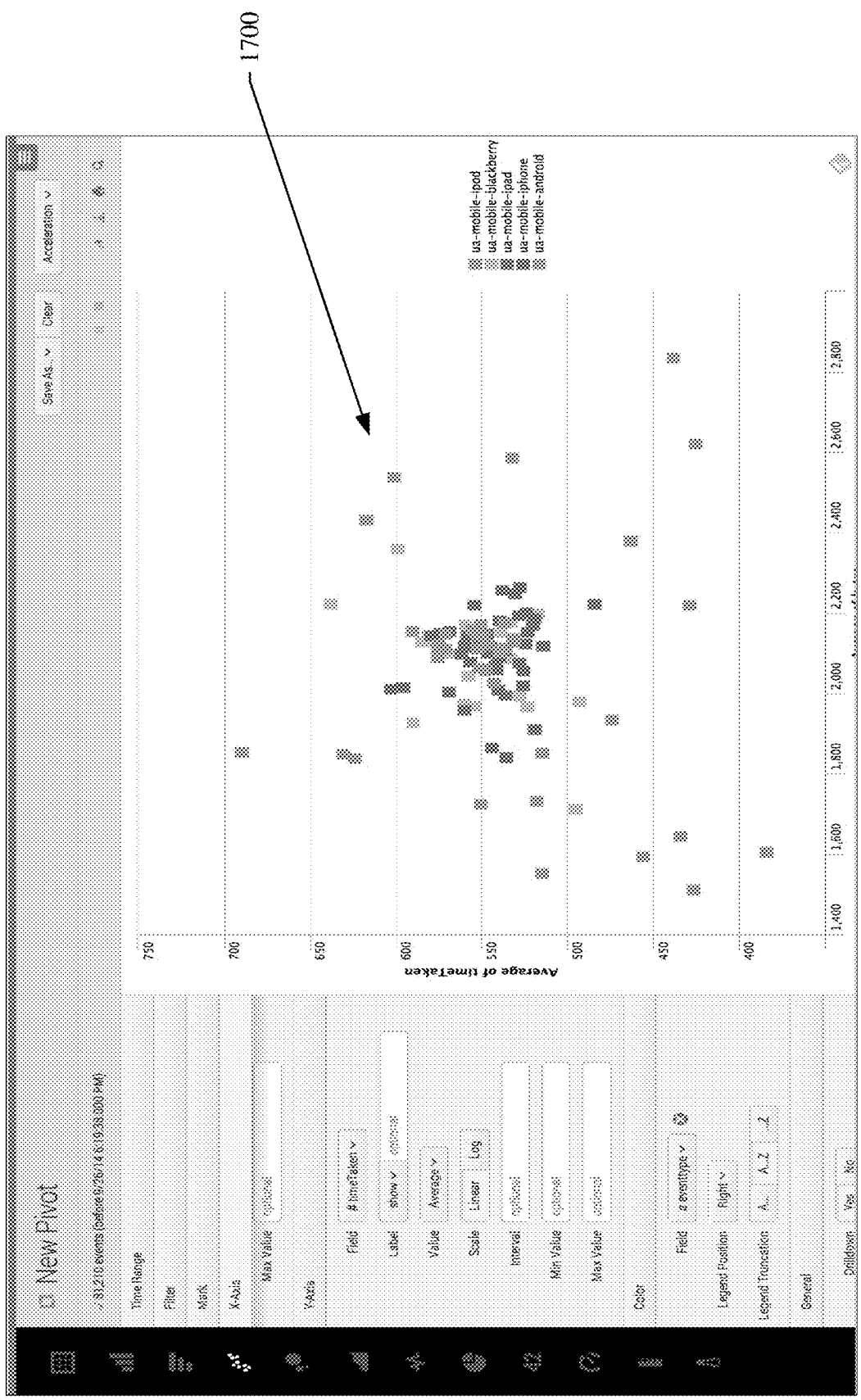

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
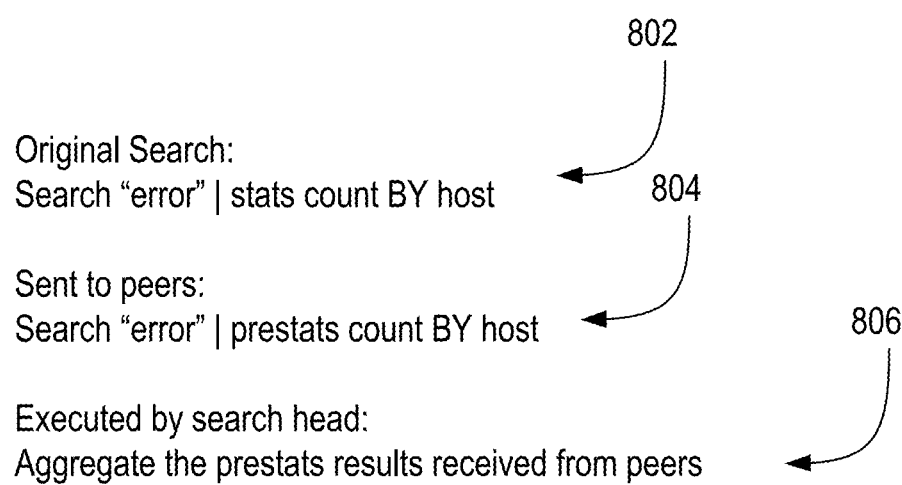
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
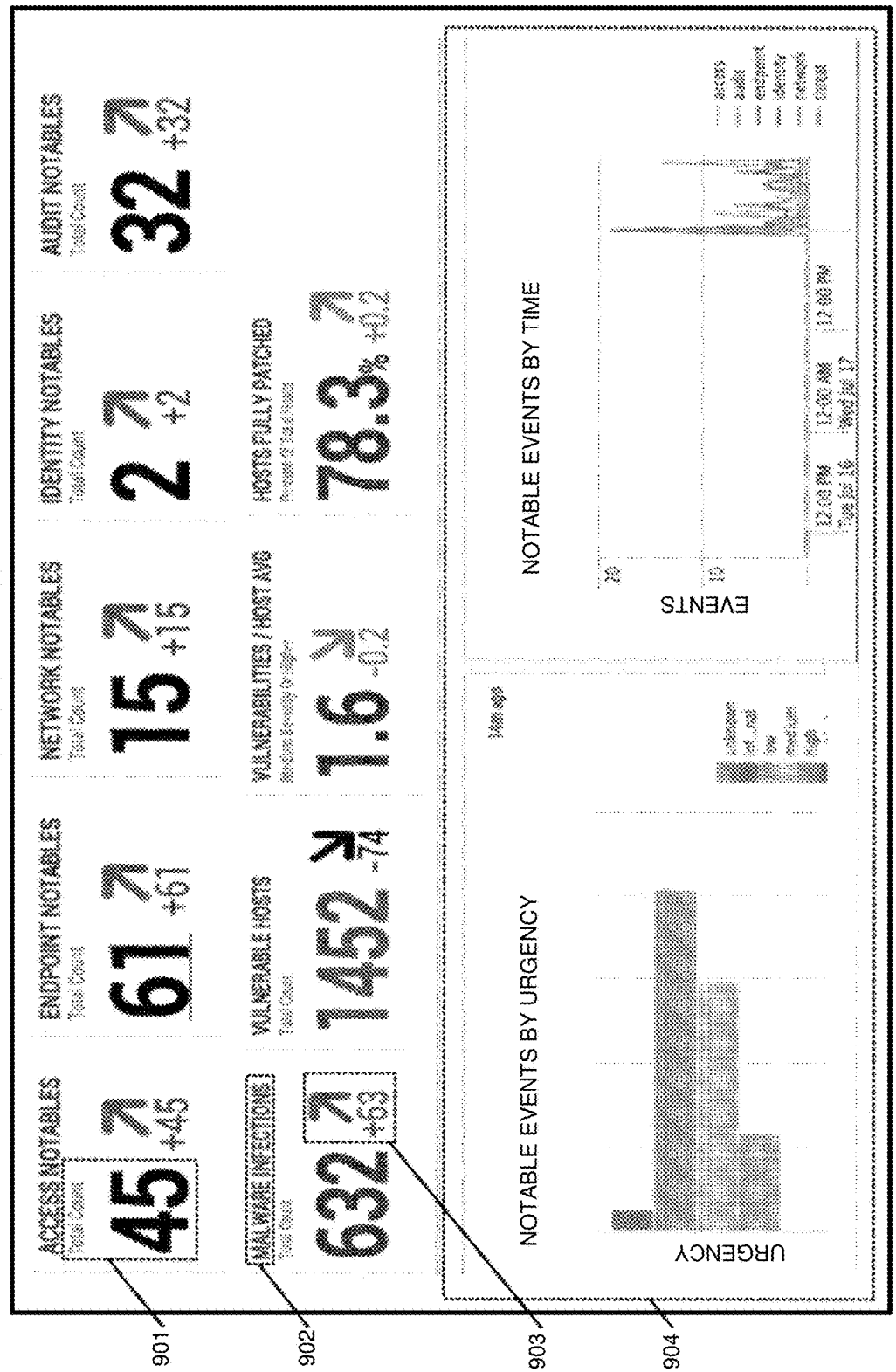
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
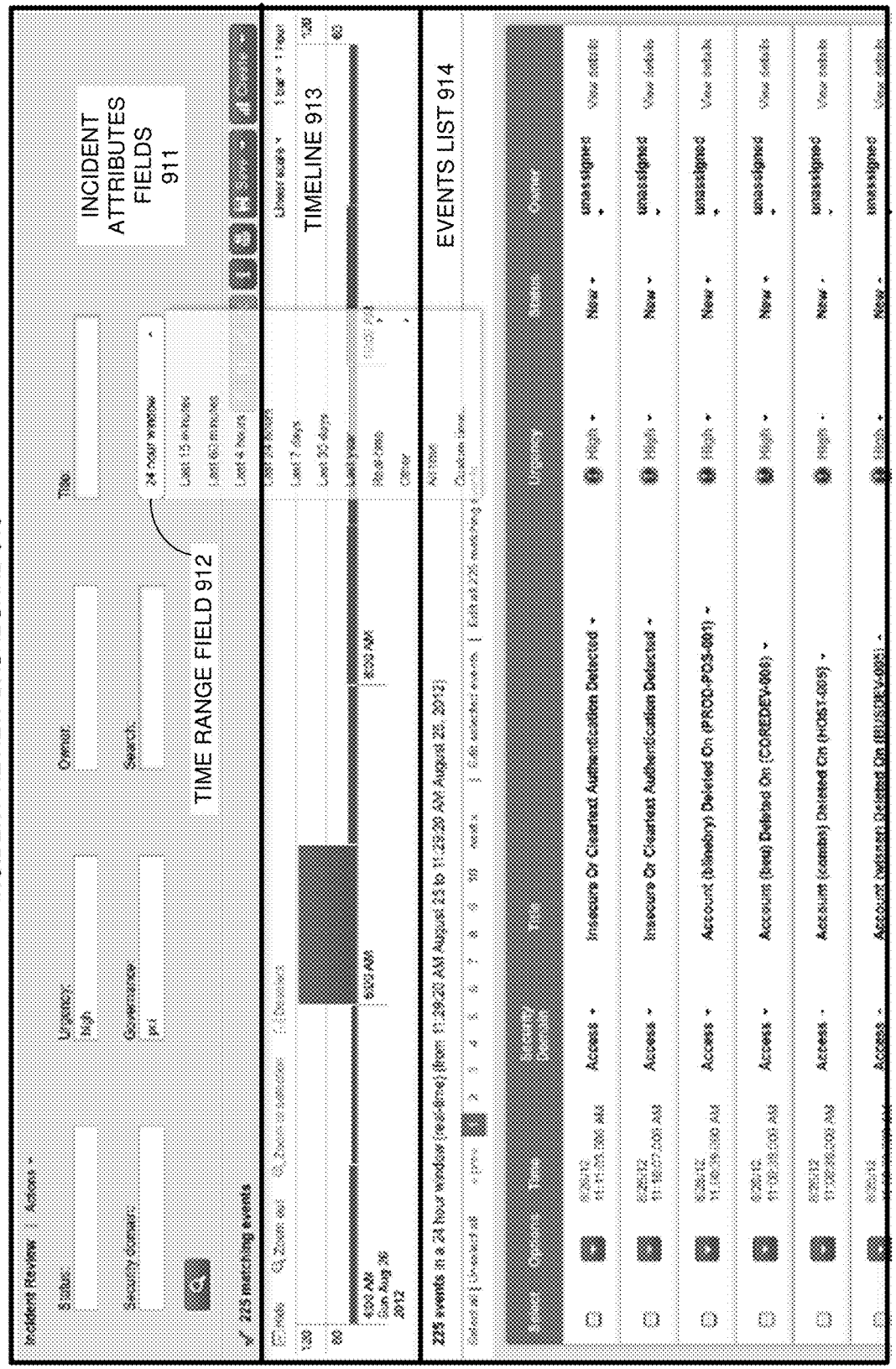
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
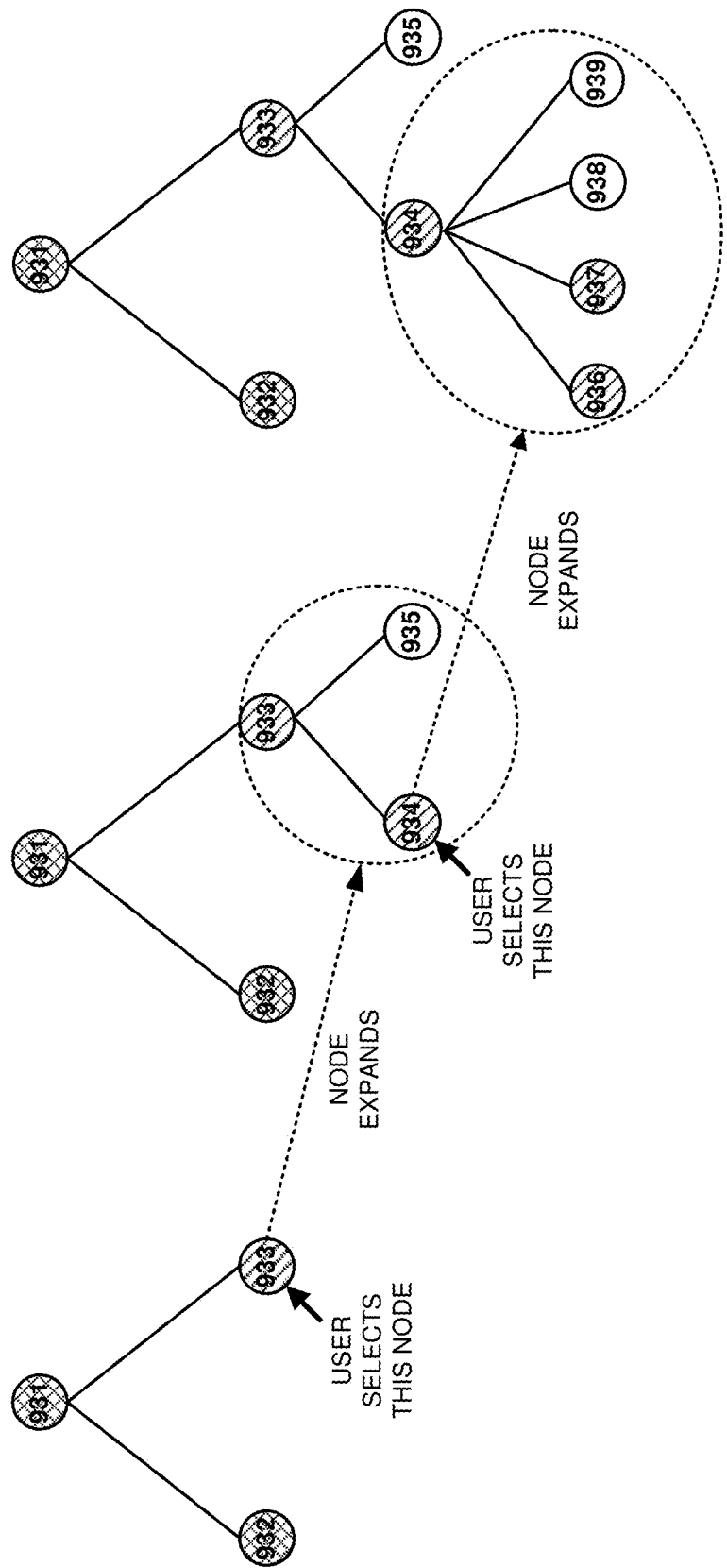
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
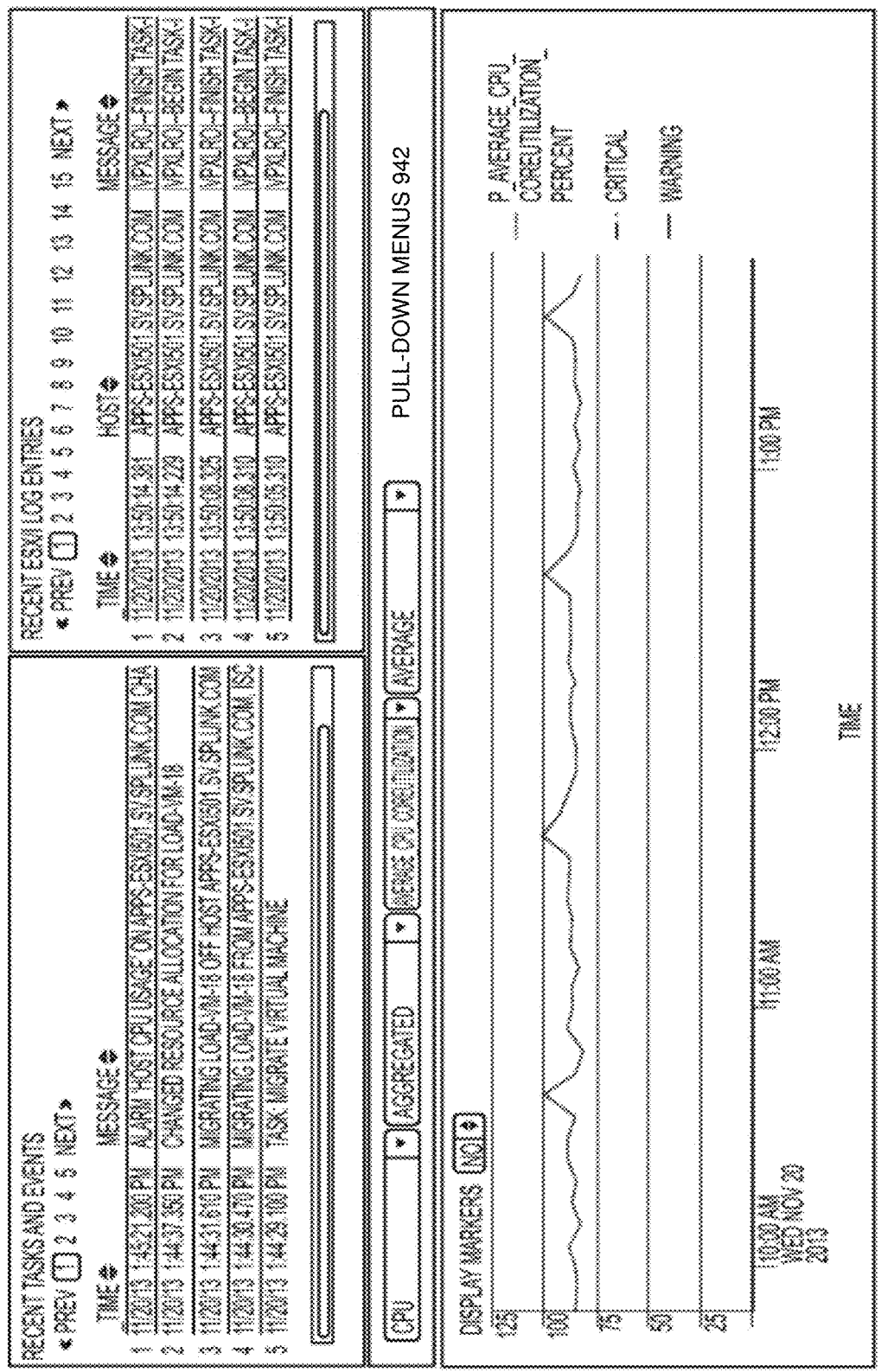
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
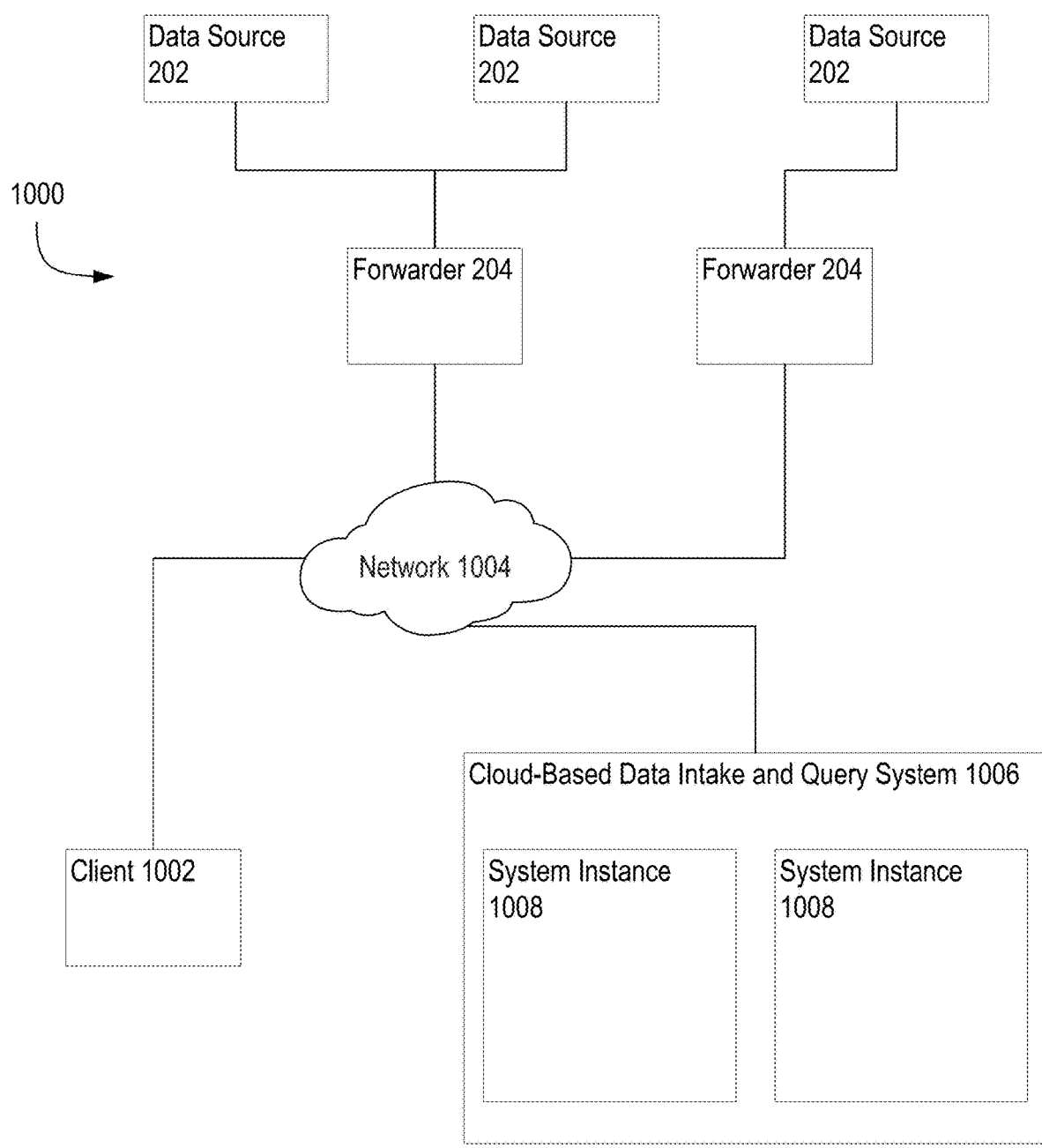
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
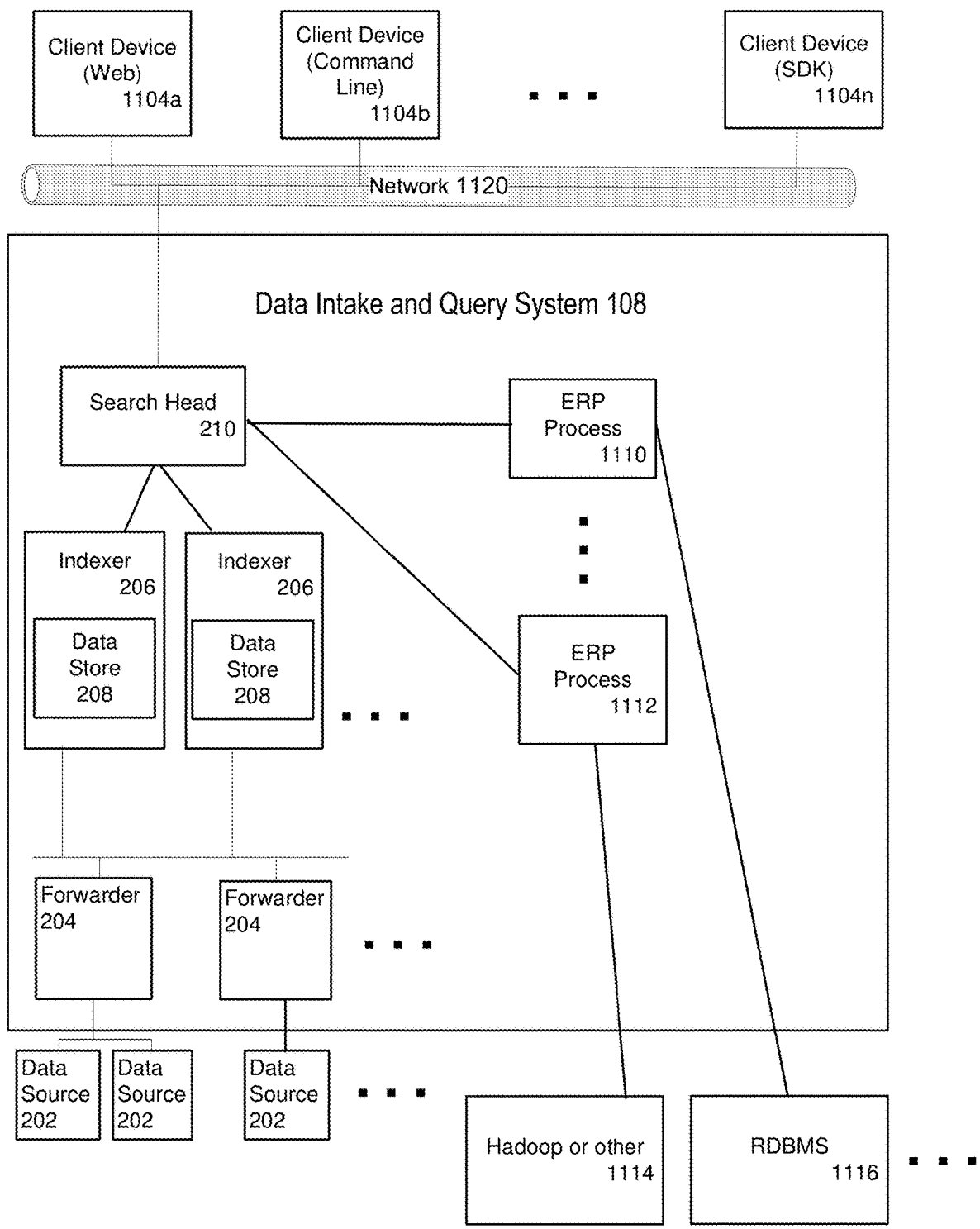
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One examplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example.

(The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0. Modular Visualizations

Challenges addressed by using an event-based data intake and query system, such as the SPLUNK® ENTERPRISE system developed by Splunk Inc. of San Francisco, Calif., already described, may benefit from robust data visualization capabilities such as those already described. Further, an embodiment may benefit when data visualization capabilities developed by one user, application developer, or domain area, such as enterprise security, can be easily accessed, reused, or reapplied by others. A visualization framework, particularly a modular visualization framework, may provide these capabilities in an embodiment. The visualization framework may provide a generalized and/or standardized interface or mechanism for requesting visualization-related services, such as requesting the rendering of a visualization for a data set. The visualization framework may also provide a generalized and/or standardized interface or mechanism for adding modular visualization service capabilities, such as performing the rendering of a visualization for a data set in a particular style, or visualization type. Various aspects of a visualization framework that is so modular and extensible may be appreciated by the skilled artisan's consideration of the disclosure of U.S. patent application Ser. No. 14/697,283, filed Apr. 27, 2015, entitled, "SYSTEMS AND METHODS FOR PROVIDING FOR THIRD-PARTY VISUALIZATIONS," which is hereby incorporated by reference in its entirety for all purposes.

The following disclosure relates to visualization frameworks. The discussion includes visualization frameworks that are modular/extensible. Embodiments include methods and apparatus to improve a user's experience by providing a list of candidate visualization types from which a user can select the visualization in the current work context. An embodiment may by some measure optimize the list. Optimization may be determined by reference to visualization-related characteristics of (i) the various visualization modules and of (ii) a user search query in the current working context. Visualization-related characteristics of a user search query during an interactive work session may be determined in real-time. Optimizations may include reducing the number of candidate visualizations presented to the user, for example, by eliminating visualization types that are incompatible with the users search results, and may include prioritizing the candidate visualizations determined to be of the greatest likely value in the working context.

Accordingly, the present disclosure is directed to providing visualization, including those that may originate with a third party. In some embodiments, an application program or web site may provide an application programming interface (API) for developers to create and add visualizations (visualization-types as modules) that may be rendered using machine-generated data (e.g., events, which may be machine-generated data associated with a respective timestamp). In some embodiments, for example, the visualizations may be generated by end-users. The computer-executable code for a visualization may be received from a developer via an API, along with one or more variable fields. The visualization may be configured to be rendered using machine-generated data and values of the one or more variable fields. The variable fields may be presented to the end-user via a graphical user interface (GUI). The end-user may change the value of one or more variable fields, each of which would cause a change in the visualization. The visualization may be re-rendered and displayed to the end-user in response to receiving a change in any variable field. In some embodiments, visualizations may be rendered using one or more different programming languages, such as JavaScript. In some embodiments, the developer and end-user may be the same person or persons. As used herein, the term "users" may be used to refer to developers and/or end-users of the visualizations.

In some instances, the visualizations which are part of the application program or website as well as visualizations received from users (e.g., third parties) may be presented to users via an interactive visualization graphical user interface (GUI). The GUI may include a menu panel corresponding to each of the available visualizations (e.g., native to application or web site, received from users). Upon selection of a visualization received from a user, the GUI may render the visualization using and/or based on input data (e.g., machine-generated data) provided by one or more data sources. In some embodiments, the GUI may also use the value(s) of the one or more variable fields to render the visualization. In some embodiments, the data may be obtained via one or more searches of machine-generated data. For example, searches of machine-generated data can be employed to identify data used to render visualizations, including searches employing late binding schema. In the context of machine-generated data, data sources can include, for example, applications, application servers, web servers, databases, networks, virtual machines, telecom equipment, operating systems, sensors, and/or the like. Although certain data sources may be described herein for the purpose of illustration, embodiments can include any variety of data sources.

Figure 18:
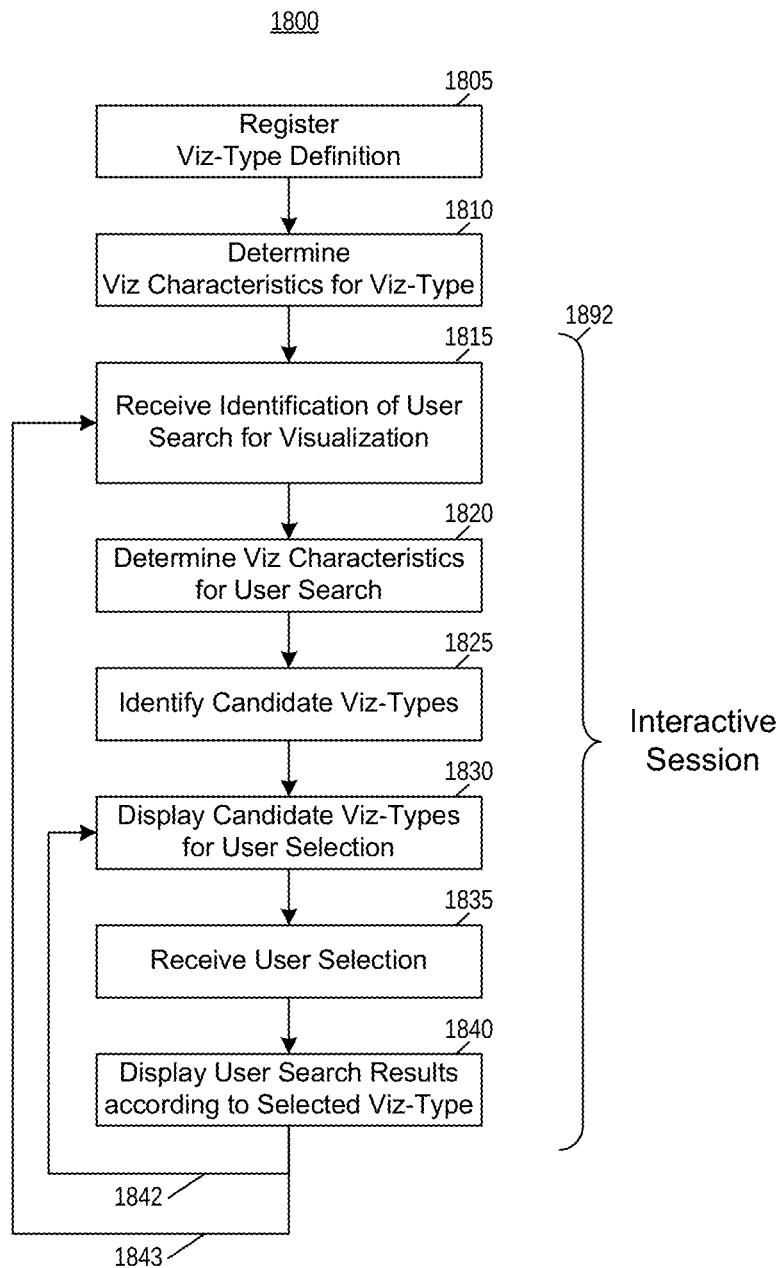
FIG. 18 illustrates a flow diagram of a process enabling user selection from a context-sensitive list of candidate visualization modules.

Turning now back to the figures, FIG. 18 illustrates a flow diagram of a process enabling user selection from a context-sensitive list of candidate visualization modules, in accordance with one or more implementations of the present disclosure. The method 1800 may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine. As is generally true throughout this discussion, the illustration, discussion, and description of flow charts, process block diagrams, processes, and methods is by way of illustration and example to aid in understanding of inventive subject matter presented herein. Not all operations may be required in all embodiments and additional operations may be performed. An embodiment may perform operations in a different sequence than shown or discussed, and operations may overlap or parallel in an embodiment. Multiple operations may be combined and single operations may be split up. One of skill appreciates these and other variations.

At block 1805, a definition for a visualization type (VIZ-type) is registered. In one embodiment, a visualization type is registered when a new or updated visualization module is installed into a visualization framework, such as when a new implementation of a particularly styled bar chart is installed. Such a registration causes the visualization framework to recognize the visualization module. Recognition of the visualization module by the framework results in the visualization-type implemented by the visualization module to be included, as appropriate, in the services provided by the framework. For example, if the visualization framework implements a service providing a list of available visualization modules or types, then the name of the newly registered VIZ-type is included in that list going forward, in the example embodiment. Different embodiments may achieve the registration of a visualization-type in different ways. For example, making an API call, installing a particularly-formatted module package at a particular location, adding or updating a configuration file, or combinations of the above may be used to effect registration. The contents of a visualization-type definition may be stored variously among embodiments.

At block 1810, visualization characteristics are determined for the VIZ-type registered at block 1805. Visualization characteristics may be characteristics, attributes, properties, tags, metadata, meta-tags, descriptors, parameters, or the like, that describe various aspects of ranges, scopes, capabilities, limits, appearance, inputs, outputs, usability, desirability, and the like, of a visualization that can be produced by the visualization module. For example, one particular VIZ-type may be determined to have visualization characteristics indicating a type of bar chart for depicting numeric values over time intervals with auto-scaling, in a fixed-size, portrait orientation, monochrome format. Further examples, illustrations, and discussion related to visualization characteristics can be recognized elsewhere in this description including in the discussions related to FIGS. 20, 21, 26, and 27, for example.

The processing described in relation to blocks 1805 and 1810 may be repeated for many visualization module definitions over time as they are added or updated in the visualization framework. The processing now described in relation to blocks 1815 through 1840 may occur in an embodiment within an interactive work session of a user as indicated by bracket 1892.

At block 1815, the computing machine receives an identification of the source of the data to be visualized—here, a user search query. The identification may be the actual text for the search query in a search query language. The identification may be some other information or identifier the computing machine can utilize to locate or retrieve the search query represented in search query language or another representation that defines it.

At block 1820, the computing machine determines the visualization characteristics for the user search of this embodiment. The processing of this block is akin to that described earlier in relation to block 1810 where the visualization characteristics for a VIZ-type were determined.

At block 1825, the computing machine identifies candidate visualization types to display for user selection at block 1830. The candidate visualization types are selected, filtered, and/or ordered, or the like, from among those registered in a visualization framework as described earlier in relation to block 1805. An embodiment may variously employ visualization characteristics determined for a VIZ-type (such as at block 1810) and for a user search (such as at block 1820) to identify the candidates. In one embodiment, all available visualizations in the registry are ordered according to a desirability ranking determined by the computing machine and identified as candidates. In another embodiment, a subset of the available visualizations in the registry is selected according to a desirability determination made by the computing machine and is identified as candidates. In yet another embodiment, these approaches are combined. Accordingly the processing described in relation to block 1825 may include aspects of prioritization, recommendation, and/or suggestion by the computing machine to the user, and in real-time. These and other embodiments are possible.

In response to the display of one or more candidate VIZ-types at block 1830, a user may make a selection from among displayed candidates. At block 1835, the computing machine receives an indication of the selection.

At block 1840, the computing machine causes the display of source data, here, the results of a user search query, visualized in accordance with the VIZ-type module selected by the user. In one embodiment, the processing of block 1840 includes interacting with the user to solicit and receive customization options for the chosen visualization type. In one embodiment, the computing machine further causes the display of other GUI elements together with the data visualization enabling user interaction. Such an embodiment may, for example, include the user search query in a text box enabling the user to edit the search query. In response to a change in the search query, the computing machine directs processing back to block 1815 as indicated by arrow 1843. Another such embodiment may, for example, display a button enabling a user to indicate a desire to try a possibly different visualization of the data. In response to a user activation of the button, the computing machine directs processing back to block 1830 as indicated by arrow 1842. These embodiments are, of course, illustrative and other embodiments are possible.

Because the processing of method 1800 bracketed by 1892 may represent work performed in real-time interaction with a computer user, timely performance is a recognizable consideration in such an embodiment. (Consider, for example, Walter J. Doherty, "The Economic Value of Rapid Response Time", IBM Systems Journal, IBM, November 1982.) Measuring from the receipt of the user search query (completion of block 1815) to the first presentation of candidate VIZ-types to the user (commencement of block 1830): one embodiment delivers average or typical response times of about 400 ms or less most of the time; another faster embodiment delivers average or typical response times of about 100 ms or less most of the time; other slower embodiments deliver average or typical response times, respectively, of about 1 second or less, 3 seconds or less, 5 seconds or less, 10 seconds or less, and 15 seconds or less, most of the time. Note that these response times for illustrative embodiments are cut off once the processing described in relation to block 1830 begins, i.e., once candidate VIZ-types start to be delivered to the user. Completion of the processing of block 1830, and for that matter, for other blocks as well, may take longer. This may be true, for example, in an embodiment that delivers candidates to the user progressively as they are identified, perhaps in a distributed or parallel processing environment.

Figure 19:
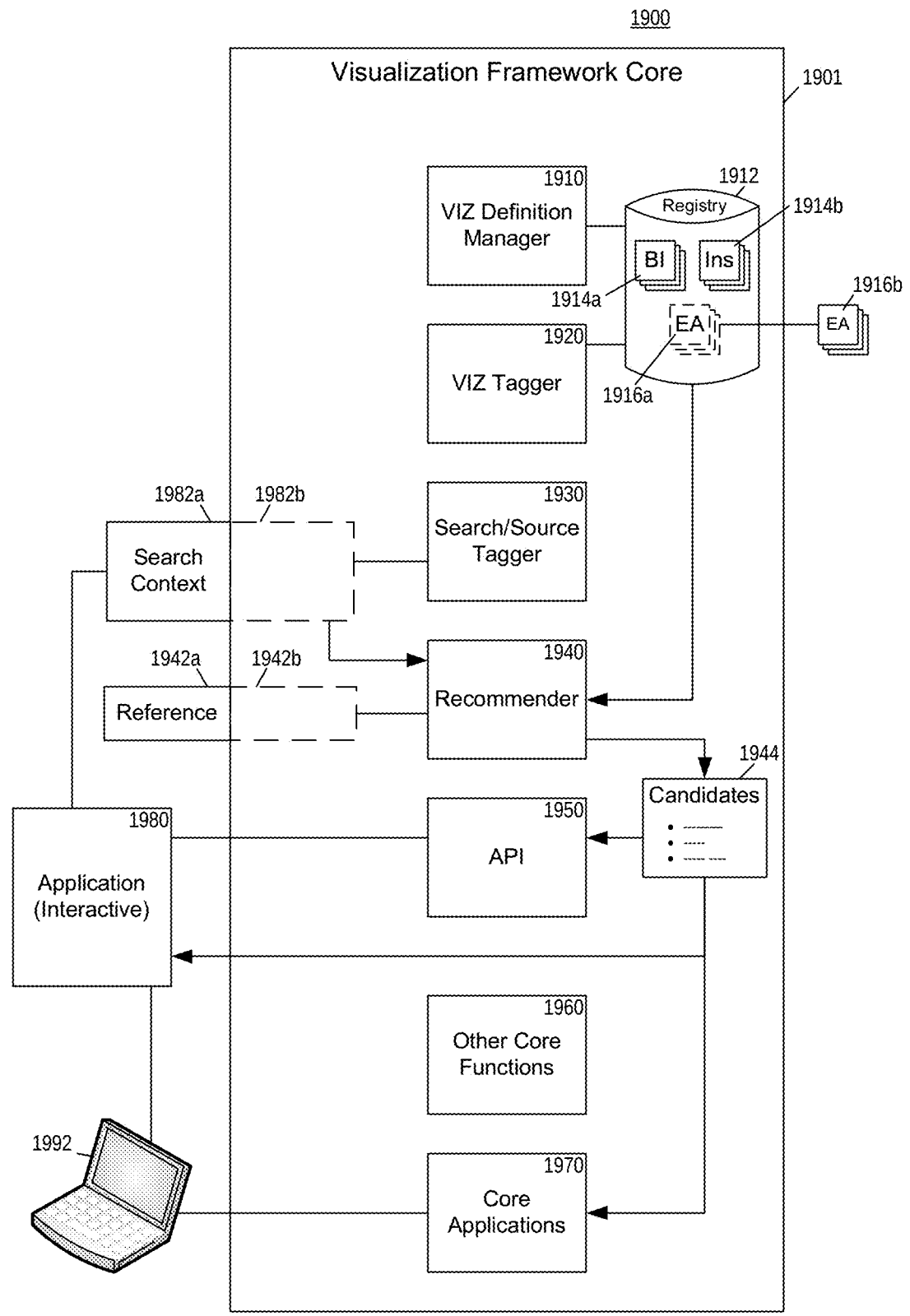
FIG. 19 illustrates a block diagram of a visualization framework core and environment of one embodiment.

FIG. 19 illustrates a block diagram of a visualization framework core and environment of one embodiment. Such a system may be useful in the implementation of method 1800 of FIG. 18. System 1900 of FIG. 19 includes visualization framework core 1901, externally available visualization modules 1916b, application 1980, and user interface apparatus 1992. System 1900 further includes a current search context having a core component 1982b and non-core component 1982a, and reference information having a core component 1942b and non-core component 1942a. Visualization framework core 1901 includes a visualization (VIZ) definition manager 1910, registry 1912, VIZ tagger 1920, search/source tagger 1930, recommender 1940, candidate list 1944, application programming interface (API) 1950, other core function component 1960, and core applications 1970. Registry 1912 further includes built-in VIZ definitions 1914a, installed external VIZ definitions 1914b, and externally available visualization module definitions 1916a.

User interface apparatus 1992 is depicted as a notebook computer device, which may be a worthwhile implementation in some embodiments. In other embodiments, dedicated user interface devices may be employed to implement 1992 such as dedicated display monitors, keyboards, mice, and touch screens, as a few examples. User interface apparatus 1992 may be implemented with hardware and/or software-controlled hardware, whether reprogrammable or not. User interface apparatus 1992 may be implemented in an embodiment with client devices such as 102 of FIG. 1. Where user interface apparatus 1992 is implemented as software-controlled hardware such as a client device 102, aspects of visualization framework core 1901 may readily be implemented on the user interface apparatus 1992 in an embodiment. Visualization framework core 1901 of FIG. 19 may be variously implemented with dedicated hardware and/or software-controlled hardware in an embodiment. Aspects of visualization framework core 1901 not implemented using a client device such as 102 of FIG. 1 may be implemented using one or more host devices 106 of FIG. 1, in an embodiment. Similarly, application 1980 of FIG. 19 may be implemented using a client device 102 or host device 106 of FIG. 1, for example. These and other implementations are possible as will be understood by one of skill in the art. Further, one of skill will recognize that software instructions or program code used to implement components of visualization framework core 1901, application 1980, and/or user interface apparatus 1992 of FIG. 19 may be recorded in non-transient, computer readable media such that when executed by general purpose computing equipment they cause the functionality, of the component—it's processes, methods, and effects—to be implemented.

Visualization (VIZ) definition manager 1910 may provide functionality to maintain and provide access to a registry 1912 of visualization modules recognized by the visualization framework core 1901. The functionality of an embodiment may include callable services. The functionality of an embodiment may include adds, changes, updates, deletions, and reporting of the definitional information in the repository 1912.

The registry 1912 in an embodiment may represent the logical collection of visualization types recognized by the framework as represented in computer storage by definitional information, wherever and however the definitional information is formatted, structured, organized, represented, and stored. The definitional information for any single visualization type and for any aggregation may be local or distributed, contiguous or noncontiguous, for example. An embodiment may include multiple logical views over the information included in the registry directly or by reference. Definitional information conforming to framework requirements or constraints may include information specifying, identifying, or referencing a computer-based process for effecting the visualization. Definitional information associated with a visualization type may be sometimes referred to as a visualization module whether or not it is contained within a particular single representational unit, such as a single file within a file system. A visualization type may have associated visualization modules in different formatting, organization, representation, packaging, or the like, possibly for different purposes. For example, in one embodiment a visualization type may be associated with a visualization module having a first format when stored as part of the registry and a visualization module having a second format for distribution, import, export, registration, serialization, or offline storage. In one embodiment a visualization module format for distribution, for example, may permit the inclusion of definitional information for multiple visualization types, with the single distribution visualization module thusly associated with multiple visualization types. These and other embodiments are possible. To avoid burdening the explanation of inventive subject matter with unnecessary detail, the discussion herein will largely assume a one-to-one correspondence between visualization types and visualization modules, the one of skill can now appreciate embodiments practicing inventive aspects are not so limited. Further, one of skill appreciates that the registry, as a logical collection, and possibly referred to as a collection, set, group, list, or the like, or as a partial portion of such, may be represented by many possible data structures, organizations, constructs, formats, or the like without departing from the inventive teachings disclosed herein.

Registry 1912 of FIG. 19 is shown to logically organize the visualization definitions into three categories, lists, sets, groups, subcategories, sublists, subsets or the like. In this illustrative embodiment, "BI" 1914a represents a category of visualization definitions that are built-in. Built-in definitions in one embodiment are visualization definitions that are distributed and installed with the visualization framework core 1901. "Ins" 1914b represents a category of visualization definitions that have been installed into the visualization framework and that are not built-in. Such installed visualization definitions may be optional visualizations that were distributed with the visualization framework core, visualizations created by a user, or visualizations created by a third-party such as an application developer, for example. "EA" 1916a represents a category of visualization definitions that are externally available. In one embodiment such externally available visualizations are known to some extent by the framework but are not implemented for use. In one embodiment, visualization definitions that are available from an online application store are included in the "EA" category. Visualization definitions 1916b represent such "EA" visualizations at their external location. In one embodiment, the format of visualization definitions for the 3 categories represented by 1914a, 1914b, and 1916a, are identical. In one embodiment, the format and content of visualization definitions are identical for the 2 categories represented by 1914a and 1914b, but category represented by 1916a differs. In one embodiment, the format and content of visualization definitions is different for each of the categories. Differing categories may have differing functionality provided by the framework. For example, the framework may include visualization rendering invocations for built-in and installed visualization definitions, but not for externally available ones. As another example, the framework may include online purchase, download, and installation for externally available visualization definitions, but not for definitions in other categories. As a contrary example, the framework may include a service for listing the names and text description of visualization types where such a listing would include visualization types from all three categories represented by 1914a, 1914b, and 1916a.

Visualization definitions in the externally available category such as represented by 1916a may be collected real-time or be maintained in a locally stored or cached list that is updated manually or automatically, for example, by periodic retrieval from an application store, in an embodiment. Visualization definitions in the built-in 1914a and installed 1914b categories are for the sake of discussion here assumed to have common format and content discussed further in relation to FIG. 20.

Block 1920 depicts a visualization (VIZ) tagger. Tagger mechanism 1920 of the computing machine in one embodiment analyzes visualization definition information identified in the repository 1912 to determine visualization-characteristics descriptive of the defined visualization and to associate those characteristics with the visualization definition, perhaps by updating the visualization definition information to include those characteristics. A more detailed look at a visualization definition in one embodiment may be helpful.

Figure 20:
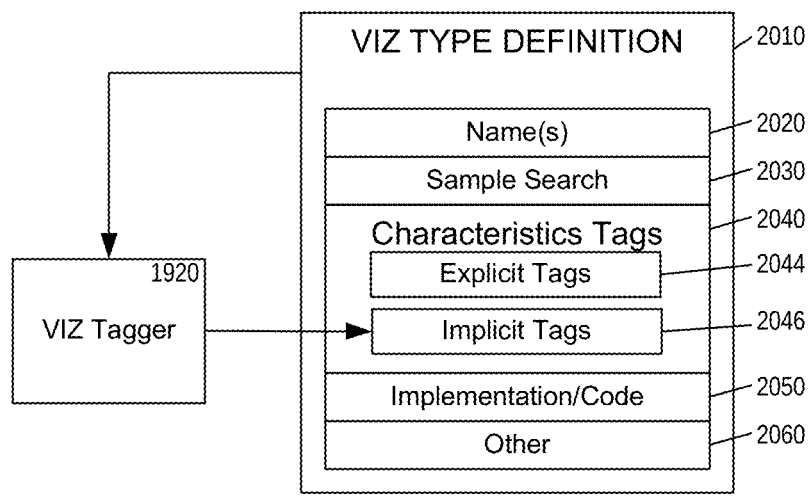
FIG. 20 illustrates a definition for a visualization type in one embodiment.

FIG. 20 illustrates a definition for a visualization type in one embodiment. The visualization (or visualization-type, or VIZ-type) definition 2010 as might be reflected in computer storage is shown in conjunction with VIZ tagger 1920 in system block diagram 2000. Definition 2010 in the illustrated embodiment includes a name/names component 2020, a sample search component 2030, a characteristics tags component 2040, and implementation/code component 2050, and an other component 2060. Characteristics tags component 2040 includes an explicit tags component 2044, and an implicit tags component 2046.

The depiction of VIZ type definition 2010 is for illustration and discussion purposes and should not be considered as implying a requirement for any particular type of data representation, structure, organization, or the like, for the information of a visualization type definition in an embodiment. The depiction of VIZ type definition 2010 may be considered to illustrate the general logical association among a number of data items, groups, collections, aggregates, or the like in computer storage that each may have singular or disparate data representation, structure, organization, or the like, within and without.

Names component 2020 may include one or more identifiers, including possibly text strings, that uniquely or otherwise identify the visualization type represented by the definition 2010. One name, for example, may be a partially or fully qualified framework name that uniquely identifies the definition within the visualization framework, and perhaps within a hierarchical or other organizational scheme. For example, ins.app.sec.explodedPie1 may be a framework name identifying the definition of an exploded pie chart visualization that was registered or installed (ins) into the framework as part of an application (app) in the security (sec) domain. Another name, for example, may be a user-friendly display name that can be used to identify the visualization type in graphical user interface displays, for example. For example, "Alarm Conditions Exploded Pie Chart" may be a display name for the visual type also identified with the framework name ins.app.sec.explodedPie1 in the earlier example.

Sample search component 2030 may include information that specifies a search query as might be executed to provide the data or dataset to be visualized by the defined visualization. In one embodiment, the sample search component 2030 may include sample parameter values that are used to substitute for parameter tokens in a search template. In another embodiment the sample search component 2030 may include some or all of the text of a search query written in a search query language that may be executed by a search query engine to provide the data or data set to be visualized by the defined visualization. In one such embodiment, the sample search component 2030 may include text written in the Splunk® SPL (Search Processing Language) as may be processed by an event-based data intake and query system, such as the SPLUNK® ENTERPRISE system, to produce the data for visualization.

Characteristics tags component 2040 may contain a collection of zero or more indicators of visualization-related characteristics, attributes, properties, tags, or the like that somehow describe the visualization type represented by definition 2010. The tag indicators in a collection in one embodiment may be represented singularly or as any combination of tokens, keywords, key-value pairs, JSON-compliant constructs, or the like.

Visualization-related characteristics may include any information that may be used, recognized, processed, or conveyed by a visualization framework embodiment to support, inform, implement, execute, condition, or otherwise effect its functionality. In an embodiment, visualization-related characteristics or tags may indicate a domain associated with the visualization such as a "network" domain and a purpose of the visualization such as "show topology," "show outliers," or "find clusters," for example. In an embodiment, tags may indicate dimensional aspects of the visualization such as the use of the Cartesian coordinate system or the number or range of dimensions supported. In an embodiment, tags may indicate that a visualization is useful for part-to-whole visualization and a purpose of the visualization such as "find outliers," or "identify biggest children," for example. In an embodiment, tags may indicate the categorized subject matter or domain associated with the visualization, examples of which include information technology (IT), security, business analytics, Internet of things (IoT, IOT), sales, marketing, logistics, and web analytics. In an embodiment, tags may indicate time-related aspects of the visualization, for example, whether the visualization aggregates by time dimensions, filters by time dimensions, or uses start and end times. (Examples of time dimensions include days-of-week {Monday, Tuesday, Wednesday, . . . }, hours-of-day {1 am, 2 am, 3 am, . . . }, day-of-week-categories {weekends, weekdays}, times-of-day-categories {9-5, after_hours}, and the like.) In an embodiment, visualization tags may include such things as requirements, limitations, ranges, defaults, preferences, or the like for orientation, use of color, color coding, data dimensions, categorical data, numerical data, autoscaling, and others.

Characteristics tags component 2020 is shown to include explicit tags 2044 and implicit tags 2046 in the illustrated embodiment. Explicit tags component 2044 represents visualization tag information that was present in visualization type definition 2010 at the time it was installed or registered with the visualization framework. Such explicit tag information may be provided by a visualization developer by, possibly, manual or automatic means, and incorporated into the visualization type definition before distribution. In one embodiment, explicit tags 2044 may include tag information that was manually added by a visualization user by means of a tag editing function provided by the visualization framework. These and other embodiments and practices are possible. Implicit tags component 2046 represents visualization tag information that is automatically determined or derived from, for example, pre-existing information in the definition 2010. The visualization tagger 1920 of the illustrative embodiment is described as performing this function and is discussed in more detail below in relation to FIG. 22.

Implementation/code component 2050 of FIG. 20 may include information to control, condition, or instruct the computing machine to perform a visualization function such as to render a particular visualization of a user data set such as a search query result. In an embodiment, implementation/code component 2050 may contain JavaScript code to perform a visualization of data. Such JavaScript code may be adapted to the framework, for example, by implementing exposed methods having standard names for the framework to invoke, or by making standard calls to framework services or functions to communicate with the framework or with an application such as 1980 of FIG. 19 indirectly through the framework. Other adaptations for compliance and interaction with the visualization framework are, of course, possible. In an embodiment, implementation/code component 2050 may contain a compiled Java executable to perform a visualization of data. In an embodiment, implementation/code component 2050 may contain parameter values that specify visualization processing performed by a parameterized computing machine function. Such computing machine function that operates in accordance with input parameter values may be included within the other core functions 1960 depicted in FIG. 19. These and other embodiments of, and related to, implementation/code component 2050 of FIG. 20 are possible.

The "other" component 2060 of FIG. 20 may include other information useful to define, describe, or utilize the visualization type associated with definition 2010. Examples of the information that may be included in component 2060 of definition 2010 include thumbnail(s), sample image(s), long and short descriptions of the visualization type, an explanation of the sample search 2030, and non-visualization keywords, tags, and the like.

Figure 22:
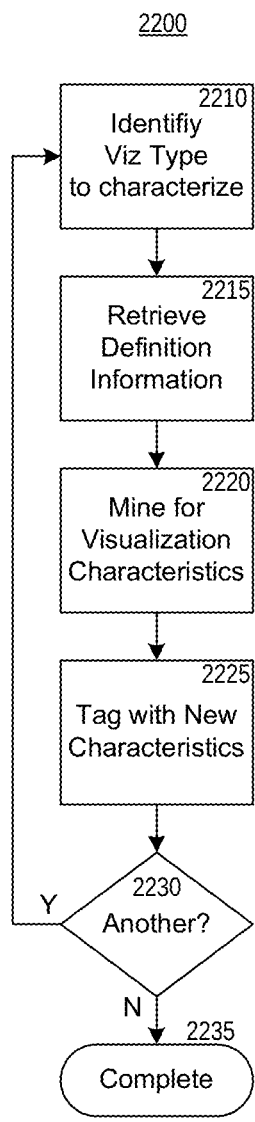
FIG. 22 illustrates a flow diagram for a method of tagging or characterizing defined visualization types in one embodiment.

As already stated, a visualization tagger such as 1920 of the illustrative embodiment may perform some or all of the process of automatically determining or deriving implicit visual tag information such as 2046 from information that may include pre-existing information in a visualization type definition such as 2010. FIG. 22 illustrates a flow diagram for such a method 2200 of tagging or characterizing defined visualization types in one embodiment. At block 2210, the visualization type to be tagged or characterized is identified. As one example, this may be accomplished by visualization tagger 1920 receiving a visualization definition included in registry 1912 from visualization definition manager 1910 on the occurrence of an add or update of that visualization definition in the registry. In such an embodiment, visualization tagger 1920 may receive the entire visualization definition, a name, identifier, or other reference which effectively identifies the visualization definition. At block 2215, visualization tagger 1920 retrieves or otherwise accesses contents of the visualization definition if not already available.

At block 2220 visualization tagger 1920 mines contents of the visualization definition in order to augment the characteristics tags (2040 of FIG. 20) component of the visualization definition with additional implicit tags (2046 of FIG. 20). Such additional data tags may be derived in many ways from many sources. In an embodiment, existing characteristics tags or other information may be mined to determine new implicit tags. For example, existing information regarding a height and a width of the visualization may be used to determine an aspect ratio tag, a page orientation tag, and a vertical stackability tag. In an embodiment, a sample search (2030 of FIG. 20) may be mined to determine new implicit tags. Further details related to such a process are discussed elsewhere, for example, in relation to FIG. 23. In one embodiment, identifiers in the visualization definition may be mined and used to discover user ratings of the visualization type from one or more sources, such as user history or an online app store, which may be used to produce a particular quality score. Other embodiments may mine these same and other components of a visualization definition, alone or in combination, in order to ascertain supplemental visualization tag information.

At block 2225 of FIG. 22 the mined, determined, derived, or otherwise produced tag or characteristic information is associated with the definition for the visualization type. For example, visualization tagger (1920 of FIG. 19) may invoke a function of visualization definition manager (1910 of FIG. 19) to insert the new tag information into the visualization definition in the registry. As another example, the visualization tagger may update a file in a file system to include the new tag information without the aid or assistance of the visualization definition manager.

At block 2230 of FIG. 22, a determination may be made whether another visualization type definition needs to be automatically characterized. If so, processing returns to block 2210, otherwise the process completes at block 2235.

Returning now to FIG. 19, search/source tagger 1930 has parallels to visualization tagger 1920 that will become apparent. Search/source tagger mechanism 1930 of the computing machine in one embodiment may analyze information related to a data source to determine visualization-characteristics descriptive of the data source and to associate those characteristics with the data source. In an embodiment, the data source is a search query, and for simplicity of discussion, search/source tagger mechanism 1930 may be referred to simply as a search tagger or search tagger mechanism. In an embodiment, a search tagger may analyze information in an about the search query itself and the data produced as a result of an execution of the search query in order to determine associated visualization-characteristics. In an embodiment, a search query may be part of the active working context of an interactive work session in which a computer user is actively participating. A more detailed consideration of such an active working context may be valuable in appreciating inventive subject matter disclosed herein.

Figure 21:
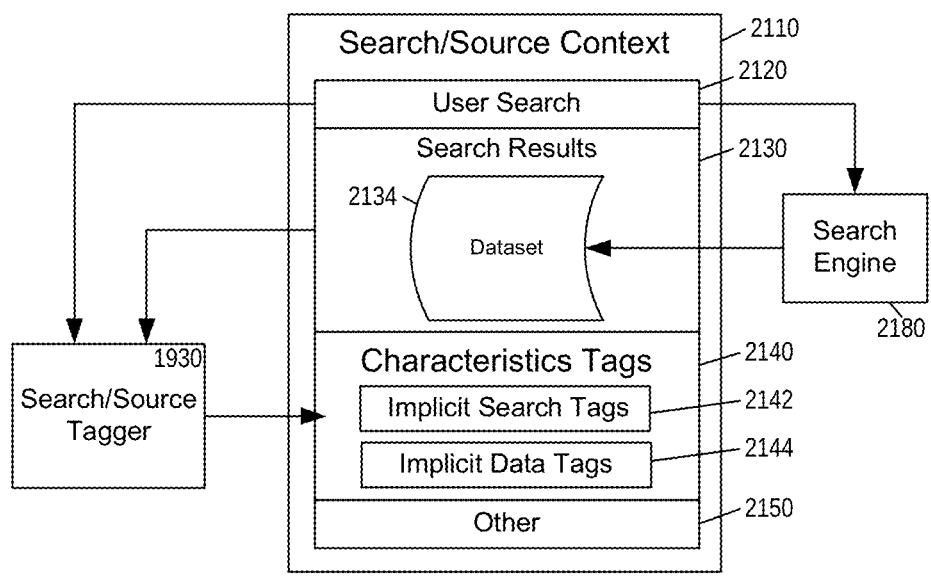
FIG. 21 illustrates the current user working context in one embodiment.

FIG. 21 illustrates the current user working context in one embodiment. Block diagram 2100 includes search context 2110, search/source tagger 1930, and search engine 2180. Search context 2100 includes components represented in computer storage including user search 2120, search results 2130, characteristics tags 2140, and "other" component

2150. Characteristics tags component 2140 is shown to include implicit search tags 2142 and implicit data tags 2144. Search results 2130 is shown to include data set 2134. In an embodiment search results 2130 may be coextensive with data set 2134. In an embodiment search results 2130 may include more than data set 2134 by including, for example, metadata about the data set. These and other embodiments are possible.

User search 2120 may include information that specifies a search query to process data in which the user has a current active interest. In one embodiment, the user search 2120 may include parameter values that substitute for parameter tokens in a search template. In another embodiment the user search 2120 may include some or all of the text of a search query written in a search query language that may be executed by a search query engine such as 2180 to provide a search result such as dataset 2134. In one such embodiment, the user search 2120 may include text written in the Splunk® SPL (Search Processing Language) as may be processed by an event-based data intake and query system, such as the SPLUNK® ENTERPRISE system, to produce a search result such as dataset 2134.

Characteristics tags component 2140 may contain a collection of zero or more indicators of visualization-related characteristics, attributes, properties, tags, or the like that somehow describe the user search 2120 or a result produced using the search, such as dataset 2134. The tag indicators in a collection in one embodiment may be represented singularly or as any combination of tokens, keywords, key-value pairs, JSON-compliant constructs, or the like. Visualization-related characteristics as already discussed may include any information that may be used, recognized, processed, or conveyed by a visualization framework embodiment to support, inform, implement, execute, condition, or otherwise effect its functionality.

Characteristics tags component 2140 is shown to include implicit search tags 2142 and implicit data tags 2144 in the illustrated embodiment. Implicit tags components 2142 and 2144 represent visualization tag information that is automatically determined or derived from the user search 2120 and the search results 2130, respectively. An embodiment may determine or derive a particular visualization tag from user search 2120 and search results 2130 in combination. An embodiment may determine or derive a particular visualization tag from user search 2120, search results 2130, existing characteristic tag information 2140, other context information 2150, and even information outside of search context 2110, or any alone, or in any combination. The search tagger 1930 of the illustrative embodiment is described as performing this function and is discussed in more detail below in relation to FIG. 23.

The "other" component 2150 of FIG. 21 may include other information useful to define, describe, record, reflect, or utilize the working context of, perhaps, and interaction session of a computer user. Examples of the information that may be included in component 2150 of context 2110 include activity history information, user profile information, user authorization information, user preference information, system management information, as a small number of examples.

Figure 23:
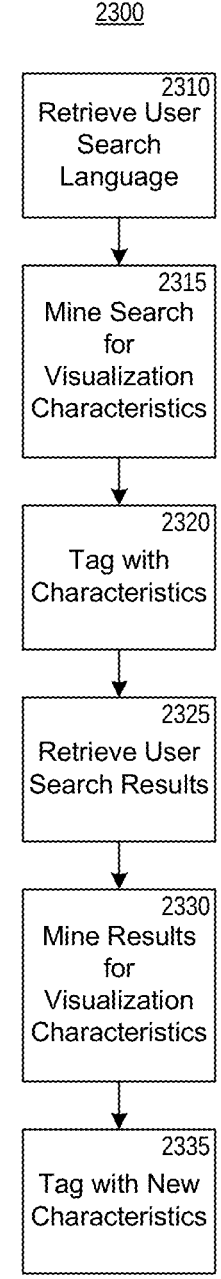
FIG. 23 illustrates a flow diagram for a method of characterizing a user search that is part of the current working context in one embodiment.

As already stated, a search tagger such as 1930 of the illustrative embodiment may perform some or all of the process of automatically determining or deriving implicit visualization tag information such as 2142 and 2144 from information within and without search/source context 2110. FIG. 23 illustrates a flow diagram for a method 2300 of characterizing a user search that is part of the current working context in one embodiment. The language or other specifying information of the user search (e.g., 2120 of FIG. 21) is retrieved or otherwise accessed at block 2310.

At block 2315 search tagger 1930 mines contents of the user search (2120 of FIG. 21) in order to augment the characteristics tags component (2140 of FIG. 21) of the search context with additional implicit search tags (2142 of FIG. 21). Such additional tags may be derived in many ways from many sources. For example, search language may be parsed and evaluated to determine that executing the search will produce a search result having three dimensions of data, two being categorical and one being numeric. In such an embodiment the evaluation to make the determination may include identifying field names within the parsed language and cross-referencing those with a data dictionary, data model, or the like to discover characteristics of a field such as whether it may be categorical or numerical. In an embodiment, the categorical, numerical, or other characteristic of a field may be inferred from the search language itself. For example, it may be inferred that a field is numerical if the search language specifies the performance of mathematical operations using the field. Other embodiments may mine these same and other components of a visualization definition, alone or in combination, in order to ascertain supplemental visualization tag information. In an embodiment, a determination that a user search produces three dimensions of data, two being categorical and one being numeric, may result in the creation of a number of tags, for example, the tags: fieldname1=cat, fieldname2=cat, fieldname3=num, dim=3, 3D, hasCategorical, hasNumeric, and data=(cat,cat,num).

As another example, search language may be evaluated to determine that executing the search will produce a search result that includes one numeric dimension named "X" and another named "Y." In an embodiment, a determination of a search result with numeric X and Y fields or dimensions may result in the identification of a number of appropriate tags, for example, the tags: 2D and cartesianCoord=Y. A determination may further be made as to whether none, one, or both of these tags are abandoned or carried forward. In an embodiment, such a determination may be made by a consideration of additional factors from within or without the search query, or both, and the consideration may include reference to rules or conditions that are hardcoded or fixed, or that are adaptively adjusted using machine learning, artificial intelligence (AI), heuristic, or other methods. As one example, an additional factor from without the search query may be a record of user history answering the question of what has been the user's most common recourse when confronted with a comparable search result. One of skill will also now appreciate that other computing machine determinations described or implied elsewhere herein may be similarly implemented.

At block 2320 of FIG. 23 the mined, determined, derived, or otherwise produced tag or characteristic information is associated with the search context. For example, search tagger (1930 of FIG. 19) may invoke a function of the visualization framework core to associate the new tag information with a visualization context construct supported by the framework, of which characteristics tags 2140 of FIG. 21 may be an instance. As another example, the search tagger may update a file in a file system to include the new tag information without the aid or assistance of the visualization definition manager.

At block 2325 of FIG. 23, search tagger 1930 of the illustrative embodiment retrieves or otherwise accesses user search results (e.g., 2130 of FIG. 21). An embodiment may detect that search results (such as 2134 of FIG. 21) already exist in computer storage and may retrieve or access those results. An embodiment may, with or without regard to the existence of existing search results, cause the execution of a user search (such as 2120 of FIG. 21) by a search engine (such as 2180 of FIG. 21) in order to create or refresh search results data (e.g., 2134 of FIG. 21) which is then retrieved or accessed at block 2325.

At block 2330 search tagger 1930 mines contents of the user search result (2130 of FIG. 21) in order to augment the characteristics tags component (2140 of FIG. 21) of the search context with additional implicit data tags (2144 of FIG. 21). Such additional data tags may be derived in many ways from many sources. An embodiment may determine implicit tag information by reference to data types discovered in the search result data and/or whether the data types correspond to data dimensions as may, for example, be known or discovered from the visualization framework, an underlying or peer event-based data intake and query system, or the like. Such an embodiment may look for string, number, date, location, and other data types. An embodiment may identify coordinate, location name, and ZIP Code search result data, for example as being of a location data type. An embodiment may determine implicit tag information by inclusion of one or more dimension names in the search result data. Examples of such dimension names may include server, network, user, Oracle, database, fraud, credit_card, TCP, port, download, and URL. An embodiment may determine implicit tag information by evaluating the completeness of coverage for a given dimension such as by evaluating the presence or absence of null fields for the dimension in the search query result. An embodiment may determine implicit tag information by evaluating the distribution of numerical values, for example, as might be seen in a histogram. Such an embodiment may detect a bell curve distribution and assess whether the curve is skewed toward one end or the other. Such an embodiment may detect an exponential distribution which may, for example, suggest alone or with other factors that the data of the search query result represents a network topology. An embodiment may determine implicit tag information by evaluating whether search result data represents any part-to-whole relationships. Such an embodiment may make the determination by recognizing known parent-child or other hierarchical sequences in the data such as {country->region}, {data center->server rack->server}, {user group->user}, {hard drive->folder->file}, and {company->business unit->region->team}, for example. Such an embodiment may make the determination at least in part by inspecting the cardinality of combinations of value between a suspected parent and child. An embodiment may determine implicit tag information after inferring network relationships by evaluating suspected source and target fields or dimensions within the data. An embodiment may perform a statistical calculation over the values for one or more fields in a search result, calculating, for example, a sum, count, average, range of values, minimum, maximum, distribution, standard deviation, or other statistic to derive a visualization tag. Other embodiments may mine these same and other aspects related to a search result, alone or in combination, in order to ascertain supplemental visualization tag information. These and other embodiments are possible.

At block 2335 of FIG. 23 the mined, determined, derived, or otherwise produced tag or characteristic information is associated with the search context. For example, search tagger (1930 of FIG. 19) may invoke a function of the visualization framework core to associate the new tag information with a visualization context construct supported by the framework, of which characteristics tags 2140 of FIG. 21 may be an instance. As another example, the search tagger may update a file in a file system to include the new tag information without the aid or assistance of the visualization definition manager.

While the foregoing discussion discussed mining the search in the search results separately for visualization characteristics, an embodiment may ascertain a visualization characteristic based on both the search and the search results. Other combinations are possible.

Returning now to FIG. 19, recommender 1940 is now addressed. Recommender mechanism 1940 of the computing machine in one embodiment produces or generates a list of candidate visualization types (e.g., 1944) in computer storage. An embodiment may analyze definition information for registered visualizations (e.g., 1914*a-b*), search context information (e.g., 1982*a/b*), and possibly other reference information (e.g., 1942*a/b*), in order to produce or generate the list of candidate visualization types (e.g., 1944). In an embodiment, reference information 1942*a-b* may include information such as the examples described in relation to component 2150 of FIG. 21. A first portion of reference information 1942*a*, ranging anywhere from none to all of the reference information, may be implemented and maintained as part of the visualization framework core in an embodiment. Examples of information that an embodiment may include in reference information 1942*a* may include user-specific such as information from a user profile that may include, for example, the user's history or favorites. A second portion of reference information 1942*b*, ranging anywhere from none to all of the reference information, may be implemented and maintained largely or wholly apart from the visualization framework core in an embodiment. Examples of information that an embodiment may include in reference information 1942*b* may include non-user-specific information such as weights, formulate, evaluation parameters and aggregations or statistics regarding histories or favorites from across many users. The illustration of non-core 1942*a* and core 1942*b* portions of reference information parallels search context information portions 1982*a* and 1982*b*.

Here, as elsewhere, the discussion of the set of candidate visualization types (e.g., 1944) as a "list" does not imply a particular form, format, representation, structure, representation, or the like, although one of the many list data structures or representations, or their equivalents, known in the art may be used to embody the set of candidate visualization types in an embodiment. Accordingly, the list of candidate visualization types (e.g., 1944) may generally be considered in terms of a list, set, collection, group, and/or aggregations or partial portions thereof, unless a specific context suggests otherwise.

The list of candidate visualization types produced by an embodiment may be an ordered or prioritized list. Such may be the case where an embodiment of recommender 1940 predicts the likely desirability of each visualization type to the user and produces a ranked list accordingly. The list of candidate visualization types produced by an embodiment may be an unordered list. Such may be the case for an embodiment of recommender 1940 serves primarily to reduce the number of visualization types presented to the user by, for example, eliminating visualization types that are incompatible with the user's data. The list of candidate visualization types produced by an embodiment may include sublists. Such may be the case where an embodiment of recommender 1940 generates the list of candidate visualization types in accordance with a number of categories, for example. These and other embodiments are possible. A portion of the list of candidate visualization types 1944 may include some or all of the list. Recommender 1940 may operate by implementing a process such as described in relation to FIG. 24.

Figure 24:
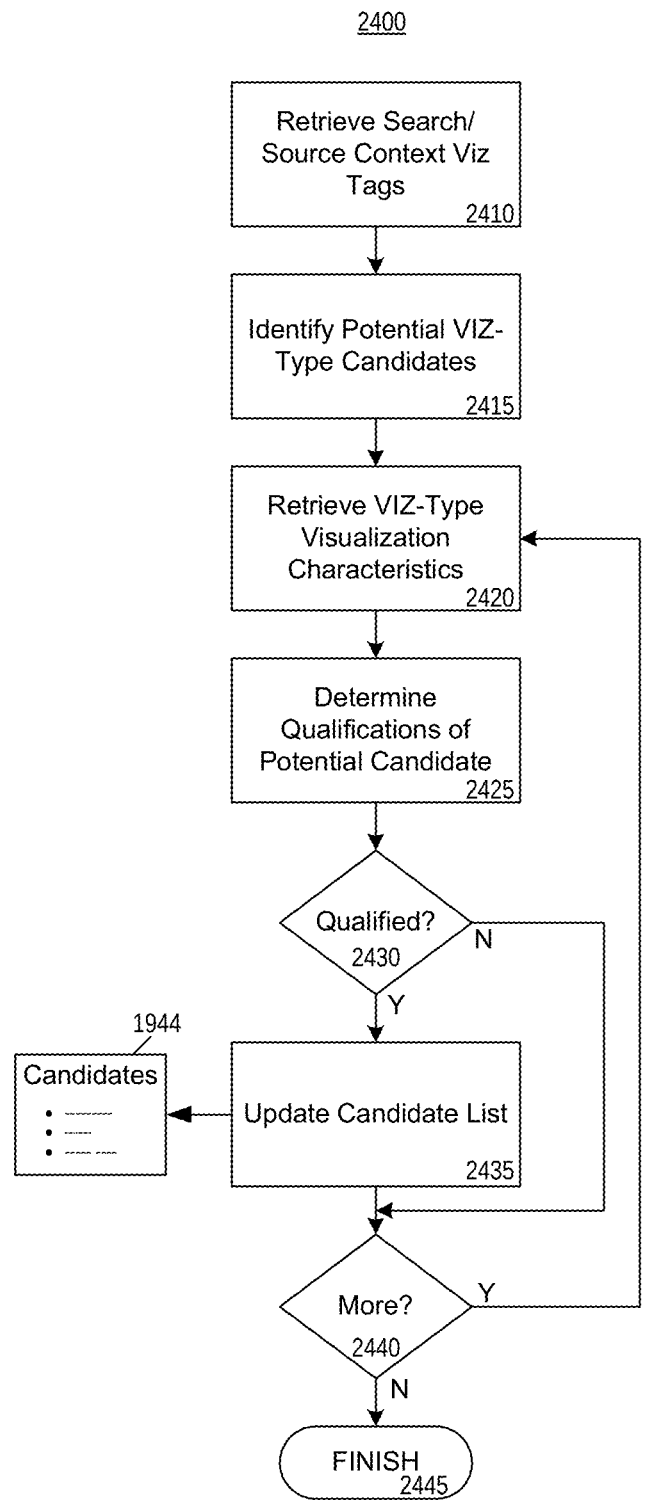
FIG. 24 illustrates a flow diagram for a method to generate a list of candidate visualization types adapted to the current context in an embodiment.

FIG. 24 illustrates a flow diagram for a method 2400 to generate a list of candidate visualization types adapted to the current context in an embodiment. At block 2410 visualization-related tags for a search/source context are retrieved or otherwise accessed. At block 2415 potential visualization-type candidates are identified. A recommender (e.g., 1940 of FIG. 19) in an embodiment may utilize functions or services of a visualization definition manager (e.g., 1910 of FIG. 19) to identify potential visualization-type candidates. In an embodiment, the potential visualization-type candidates may be identified by receiving references to, or the content of, all of the visualization-type definitions registered with the framework core. In an embodiment, the potential visualization-type candidates may be identified by receiving references to, or the content of, less than all of the visualization-type definitions registered with the framework core. In such an embodiment, the filtering applied to the visualization-type definitions to produce the delivered subset may be a function of the defined operation of the visualization definition manager, itself. For example, a function of the visualization definition manager called by the recommender to identify the potential candidates may as a matter of course omit externally available visualization-type definitions (e.g., 1916*a* of FIG. 19). In a different such embodiment, the filtering applied to the visualization-type definitions to produce the delivered subset may be in accordance with information provided to the visualization definition manager by the recommender. For example, the recommender may provide the visualization definition manager with certain visualization tags of the search context retrieved in an earlier performance of block 2410, and the visualization definition manager may use the tag information to filter only compliant or compatible visualization-type definitions.

At block 2420, the recommender of an embodiment may retrieve visualization characteristics for one of visualization-types identified as potential candidates at block 2415, if the characteristics were not already supplied as part of the processing of block 2415. In an embodiment, all of the visualization characteristics for the potential candidates are retrieved. In an embodiment, visualization characteristics for the potential candidates are retrieved selectively. For example, only visualization characteristics related to data dimensionality may be retrieved.

At block 2425, a determination is made as to the qualifications of the potential candidate. Different embodiments may vary greatly as to the complexity and sophistication of this determination. In one embodiment, the determination may be made solely by matching one or more visualization tags of the user search with identical visualization tags of a visualization-type. In one embodiment the determination may be made as to a visualization-type by accumulating weighting values associated with each visualization tag of the user search that matches a visualization tag of the visualization-type to thereby produce a prioritized score or ranking value which may be used as a qualification value of the potential candidate. In one such embodiment, the weighting values may be automatically adjusted from time to time, or dynamically in real-time or near real-time, by processes associated with the recommender that employ machine learning, artificial intelligence (AI), heuristics, or other computing mechanisms, to best predict or ascertain weighting values that optimally match user desires, organizational goals, or the like, alone or in combination.

At block 2430, a determination is made as to whether a potential candidate is adequately qualified. In an embodiment, any indication of qualification may result in a determination that the potential candidate is adequately qualified. In an embodiment, a prioritized score may be compared to a threshold value to determine whether the potential candidate is adequately qualified. If the determination indicates that the potential candidate is not qualified, processing proceeds to block 2440. If the determination indicates that the potential candidate is qualified, processing proceeds to block 2435 where the candidate list 1944 is updated to include the newly qualified candidate. In an embodiment, the candidate list 1944 may be updated by appending an identification of the qualified candidate to the end of the list. In an embodiment, the candidate list 1944 may be updated by inserting an identification of the qualified candidate into an ordered list. Ordering of the list may be based, for example, on a prioritized score or ranking value such as may be produced at block 2425. Processing may then proceed to block 2440. At block 2440, a determination is made whether any more potential visualization-type candidates exist. If so, processing may proceed to block 2420. If not, processing may proceed to finish at block 2445. Once generated, candidate visualization type list 1944 may be used, for example, to populate a graphical user interface element enabling a computer user to select a visualization type for her current search query. Examples will be discussed below in relation to subsequent figures.

Returning to FIG. 19, application 1980 and core applications 1970 are illustrated as potential recipients of a candidate visualization type list 1944. Application 1980 is external to the visualization framework core 1901 and may represent a third-party or user-developed application which may be interactive. Application 1980 may receive candidate list 1944 either directly or via API 1950. Core applications 1970 may include one or more applications that are part of the visualization framework core 1901. Such a core application may, for example, provide a straightforward, generalized ability for a user to enter and execute a search query and to visualize the resulting data. Such a core application may anticipate an interactive work environment and interface with a user via user interface apparatus 1992, as may application 1980. Application 1980 and an application of core applications 1970 may utilize candidate visualization-type list 1944 to populate a graphical user interface element or portion enabling a computer user interfacing through apparatus 1992 to select a visualization type for her current search query. Presenting a user with options from a candidate list 1944 produced by recommender 1940 of the computing machine may improve user satisfaction, reduce interruption to the user's productive workflow that might otherwise be caused by getting sidetracked in suboptimal visualization selection, reduce the burden on the computing machine to deliver more selection options before a selection is actually made, and reduce the time user interface apparatus 1992 is occupied to achieve a particular production result. Accordingly, the practice of certain inventive concepts disclosed herein results in a new and superior computing apparatus.

Other core functions block 1960 of FIG. 19 represents additional functionality of the visualization framework core 1901 that may not have already been described or alluded to. Block 1960 may include, for example, functionality for device and/or format mapping of visualizations.

API block 1950 of FIG. 19 may represent all application programming interfaces (APIs) implemented in the visualization framework core 1901. This may include externally facing APIs as illustrated by the connection between API block 1950 and external application 1980. This may also include APIs that face inwardly to components of the visualization framework core. For example, visualization tagger 1920 may expose an API via block 1950 that is invoked by visualization definition manager 1910 on the occurrence of an add or update of a registered visualization definition. Similarly, visualization definition manager 1910 may expose an API via block 1950 that is invoked by visualization tagger 1922 insert newly discovered visualization characteristics into a definition in the registry.

It has been already noted that a system 1900 of FIG. 19 may be useful in the implementation of method 1800 of FIG. 18. Upon consideration of the foregoing it may be recognized and appreciated that the visualization tagger mechanism 1920 of FIG. 19 may be particularly useful in performing the processing described in relation to block 1810 of method 1800 of FIG. 18, and that the search/source tagger mechanism 1930 of FIG. 19 may be particularly useful in performing the processing described in relation to block 1820 of method 1800 of FIG. 18, and that recommender mechanism 1940 of FIG. 19 may be particularly useful in performing the processing described in relation to block 1825 of method 1800 of FIG. 18. FIG. 18 further includes blocks 1815, 1830, 1835, and 1840 of method 1800 which may implicate user interaction in an embodiment, and such user interaction may be effectively implemented by employing a graphical user interface (GUI). Embodiments of GUI displays as might be useful in the practice of method 1800 are next described.

FIGS. 25-28 depict example user interface displays as may be caused by the practice or operation disclosed embodiments. One of skill will appreciate that the depicted user interface displays represent not only display images but the functionality that underlies them to enable user and application interaction.

Figure 25:
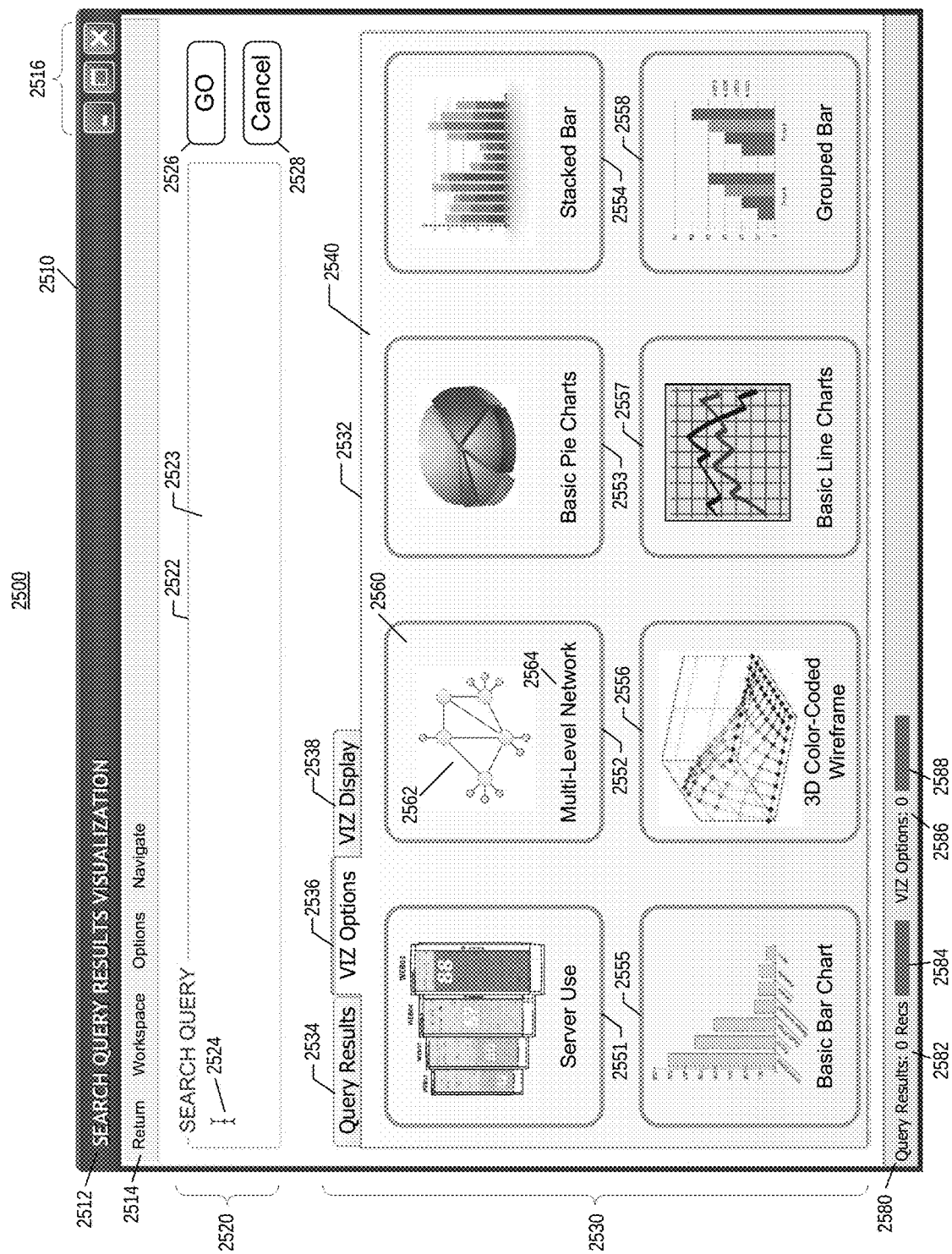
FIGS. 25-28 depict example user interface displays as may be caused by disclosed embodiments.

FIG. 25 depicts a display image of a user interface in one embodiment. Display image 2500 is such as might be caused to be presented on user interface apparatus 1992 by the operation of application 1980 or one of core applications 1970 of FIG. 19. Display image 2500 of FIG. 25 includes window area 2510. Window area 2510 includes title bar 2512, menu bar 2514, window control buttons 2516, search query area 2520, multipurpose area 2530, and status bar 2580. Search query area 2520 includes search query text box 2522, go button 2526, and cancel button 2528. Search query text box 2522 includes text box contents 2523 which is shown to include text cursor 2524. Multipurpose area 2530 is shown as a tabbed interface by virtue of query results tab 2534, VIZ options tab 2536, VIZ display tab 2538, and tab display area 2532. Tab display area 2532 is shown to include tab display area contents 2540 which are associated with the currently selected tab, VIZ options, 2536. Tab display area contents 2540 includes visualization option tiles 2551 through 2558. An individual visualization option tile such as 2552 includes tile display content 2560. Tile display content 2560 is shown to include visualization thumbnail image 2562 and visualization name 2564. Status bar 2580 is shown to include a textual description of query results 2582 and an associated progress bar 2584. Status bar 2580 is also shown to include a textual description of VIZ options 2586 and an associated progress bar 2588.

Display image 2500 is such as might be employed in the user interface when attempting to receive the identification of a user search for visualization such as during the processing of block 1815 of method 1800 of FIG. 18. Search query text box 2522 is enabled to receive from the user and display the text of a search query. Go button 2526 of search query area 2520 is enabled for user interaction, such as by a mouse click or a press on a touchscreen. Having entered the text of a search query into search query text box 2522 a user may activate go button 2526 to cause the application to consider the text of the search query text box 2522 as ready for processing and accordingly to receive an identification of the user search for visualization.

The visualization types represented by the tab display area contents 2540 at the early stage of processing suggested by display 2500 (i.e., the search query text box 2522 contains no search) may come from a generally available list of visualization types, such as a default list, rather than from a visualization-type candidate list as earlier described, in one embodiment. In an embodiment, the visualization types represented by the tab display area contents 2540 at the early stage of processing suggested, may indeed come from a visualization-type candidate list produced by a computing machine recommender as earlier described, however based on factors not related to the current user search query or its results, as neither is extant in the presumed timeframe.

Despite the absence of a search query in display 2500, an embodiment may nonetheless enable user interaction with visualization option tiles 2551 through 2558. An interaction with one of the tiles, such as a mouse click, may cause the application to receive it as the user's selection of the visualization-type represented by the tile. A different interaction with one of the tiles may produce a different response as will next be described in relation to FIG. 26.

Figure 26:
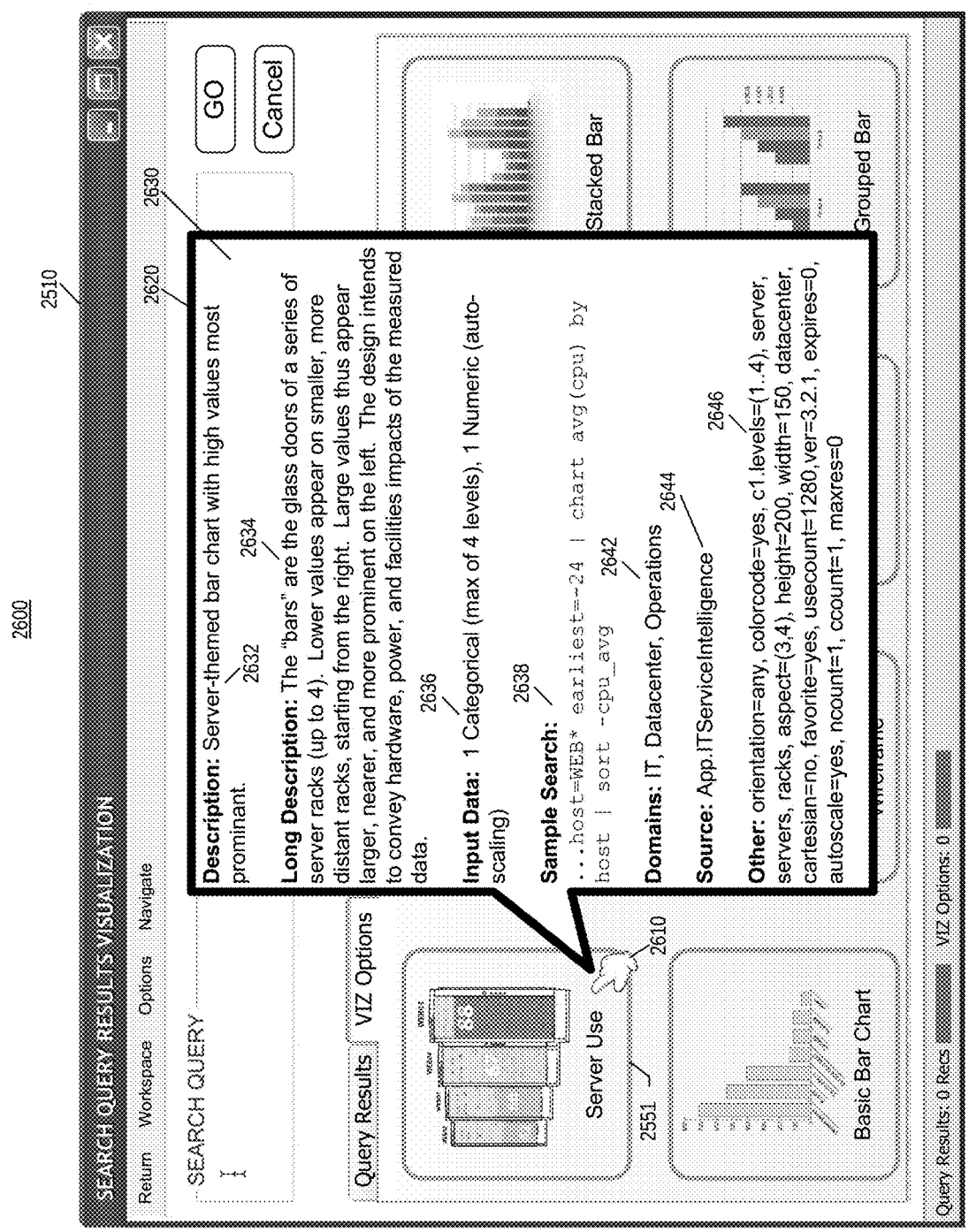

FIG. 26 depicts a display image of a user interface in one embodiment including detailed information for a visualization type in response to a user interaction with a visualization option element. Display image 2600 of FIG. 26 includes the window area 2510 of FIG. 25 essentially overlaid with cursor icon 2610 and popout box 2620 of FIG. 26. Cursor icon 2610 appears in display 2600 in response to a user moving a pointer over visualization option tile 2551, in this illustrative embodiment. When the user leaves the pointer in a fixed position over the visualization option tile for some short period of time the GUI may perform a hover-over event action defined for the tile. In this illustrative embodiment the hover-over event action displays popout box 2620. The displayed content 2630 of popout box 2620 is shown to include description information 2632, long description information 2634, input data information 2636, sample search information 2638, domain information 2642, source information 2644, and other information 2646. All of the information appearing as displayed content 2630, other than the bold headings, may come from the visualization-type definition in the registry of a visualization framework. In an embodiment having visualization-type definitions as depicted in FIG. 20, description information 2632 and long description information 2634 may come from the other component 2060 of the definition; input data information 2638, domain information 2642 and source information 2644 may come from the characteristics tags component 2040 of the definition; sample search information 2638 may come from the sample search component 2030 of the definition; and other information 2646 may come from either characteristics tags component 2040 of the definition, other component 2060 of the definition, or both.

Figure 27:
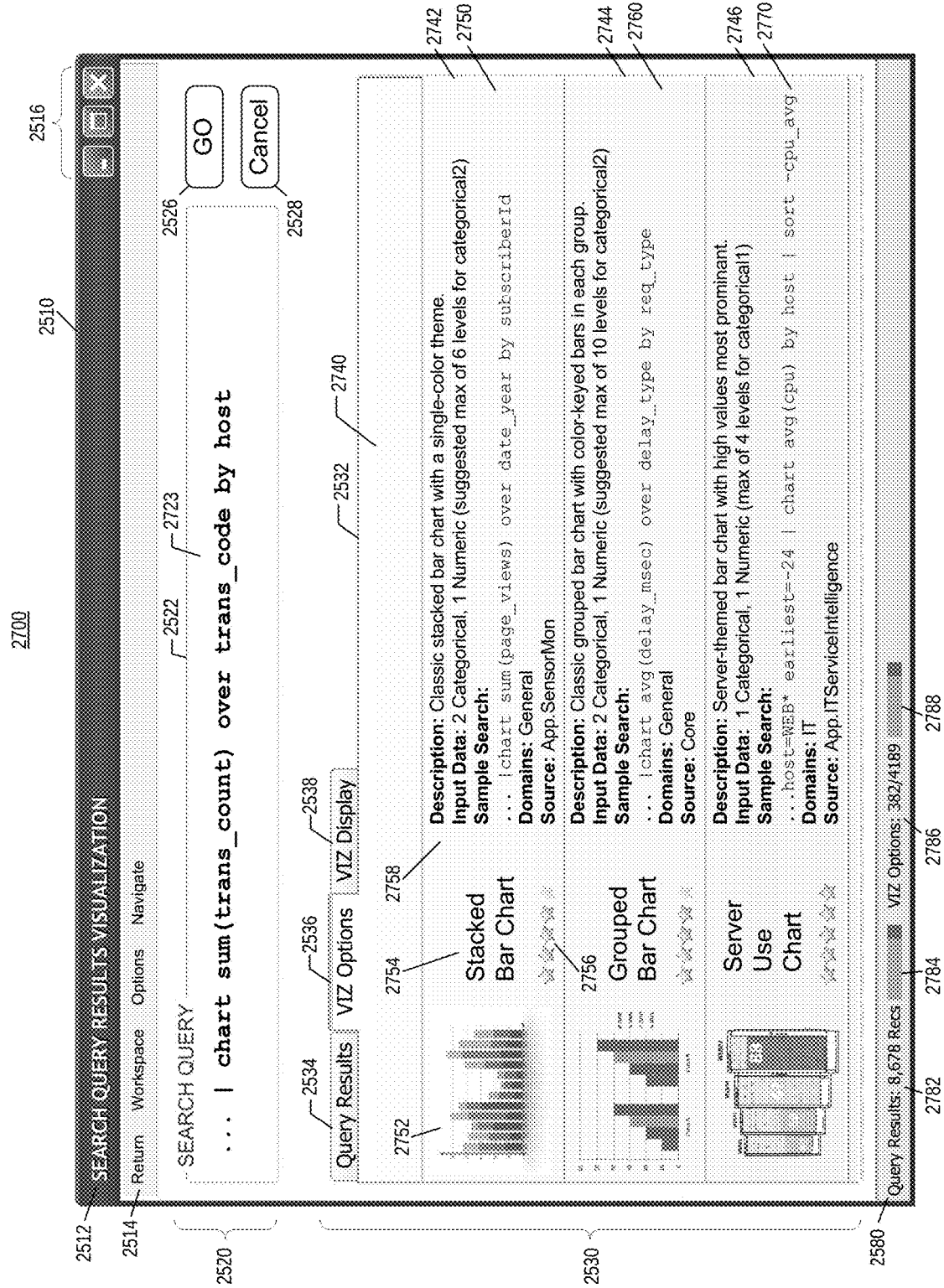

FIG. 27 depicts a display image of a user interface in one embodiment. Display image 2700 includes window area 2510 differing from the displayed content shown in FIG. 25 by the presence of search query text (text box contents 2723), and by a differing display format, content selection and ordering for visualization-type information (tab display area contents 2740). Display image 2700 may be produced as the result of a user entering search query text into search query text box 2522. An embodiment may or may not require an additional interaction, such as a press of go button 2526, before working to present visualization-type information in accordance with a visualization-type candidate list produced by a recommender. Once the application acquires a visualization-type candidate list that reflects the current working context, it may modify the tab display area contents 2740 to conform with the visualization-type candidate list, as reflected in the visualization-type selection and ordering shown. The change in display format for visualization-type information shown in 2700 is for illustrative purposes and such a change in format may or may not accompany a transition in content selection and ordering based on a visualization-type candidate list, in an embodiment.

Tab display area contents 2740 of tab display area 2532 is shown to include three visualization option display areas 2742, 2744, and 2746, each occupying the entire width of tab display area 2532. Respective visualization option display area contents 2750, 2760, and 2770 each presents information relating to a single visualization-type. In an embodiment, visualization option display area contents 2750 appears in the top visualization option display area 2742 because it occupies a position of greater precedence in the visualization-type candidate list in effect. In such an embodiment visualization option display area contents such as 2750, 2760, and 2770 may be placed into visualization option display areas 2742, 2744, and 2746 in the order the associated visualization-types appear in the active visualization-type candidate list. Visualization option display area contents 2750, as a representative example, includes visualization thumbnail image 2752, visualization name 2754, rating indicator 2756 and detailed information 2758, all derived from information in a corresponding visualization-type definition.

Status bar 2580 is shown to include query results information including a record count 2782, an associated progress bar showing partial completion 2784, VIZ options information including a count of the qualifying visualization-types and the size of the visualization-type pool 2786, and an associated progress bar showing partial completion 2788. Such contents of status bar 2580 in conjunction with the remaining content of display image 2700 is already described, suggests an embodiment that progressively displays visualization-type candidates as they are available. In an embodiment, clicking anywhere within visualization option display area 2742 will signal the application that the user has made a selection of the visualization-type represented therein. After such as selection, in an embodiment, the user may interact with VIZ display tab 2538 to see the data visualization. Doing so may result in the display image depicted in FIG. 28.

Figure 28:
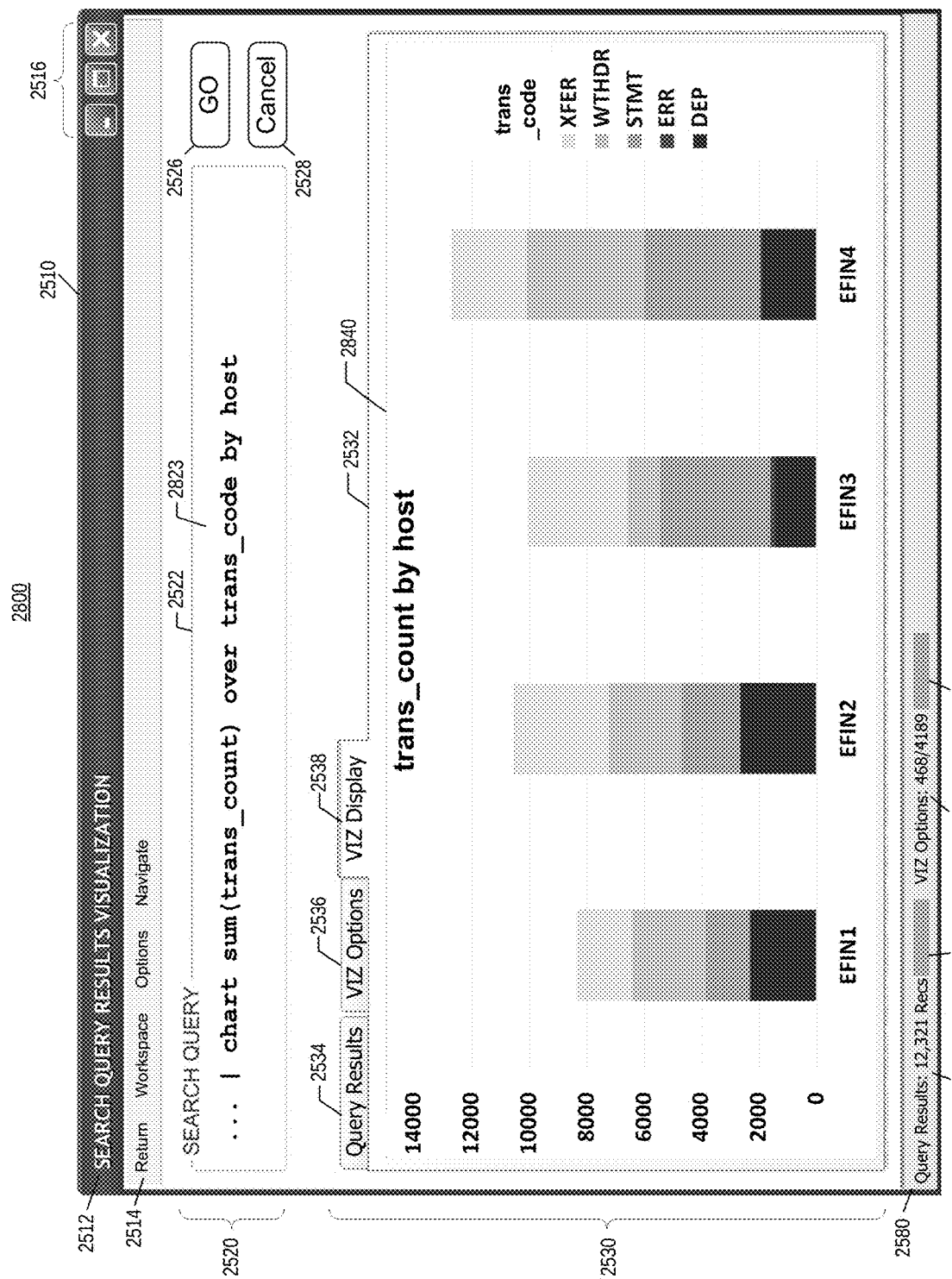

FIG. 28 depicts a display image of a user interface in one embodiment that includes a visualization of user search query results. Display image 2800 includes window area 2510 differing from the displayed content shown in FIG. 27 by the transition from a selected VIZ Options tab 2536 to a selected VIZ display tab 2538 resulting in the appearance of a data visualization for the tab display area contents 2840, and by updates to the contents of status bar 2580 to show the completion of activity (2882, 2884, 2886, and 2888). The stacked bar chart of 2840 visualizes the results of the user's current search query using the visualization-type selected by the user as described in relation to FIG. 27.

After consideration of the foregoing one of skill will appreciate the many inventive aspects revealed herein. While these inventive aspects have been taught with the aid of illustrative embodiments, one of skill will appreciate that the details disclosed for these embodiments are for the purpose of illustrating, and not limiting, the inventive aspects, including those inventive aspects which are set forth in the claims that follow.

What is claimed:

1. A method implemented by a computer system, the method comprising:
    receiving, by the computer system, a search query entered using a graphical interface, the search query identifying data of active interest to a user and to be visualized;
    analyzing, by the computer system, the search query to ascertain one or more visualization characteristics associated with the search query, wherein each visualization characteristic of the one or more visualization characteristics describes a visualizable aspect of a set of events;
    accessing, by the computer system, a set of visualization types registered with a visualization framework, each visualization type of the set of visualization types including a stored characteristics tag component, search component, and code component, wherein the characteristics tag component includes an indicator of a visualization-related characteristic, wherein the search component specifies a sample search query representative of at least a portion of an actual search query that can be executed to provide data to be rendered by a visualization of the visualization type, wherein the sample search query is not used to generate the visualization, and wherein the code component includes instructions for rendering the data into the visualization;
    determining, by the computer system, a set of candidate visualization types from the set of visualization types, wherein a candidate visualization type is included in the set of candidate visualization types based on a visualization characteristic associated with the search query corresponding to a characteristics tap component included in the candidate visualization type or the search query corresponding to a search component included in the candidate visualization type;
    causing, by the computer system, the display of a graphical interface that indicates the set of candidate visualization types and enabling user interaction to indicate a selection of a particular visualization type from the set of candidate visualization types.

2. The method of claim 1 wherein the search query comprises text in a search query language.

3. The method of claim 1 wherein ascertaining the one or more visualization characteristics comprises deriving a visual characteristic from the search query.

4. The method of claim 1 wherein ascertaining the one or more visualization characteristics comprises deriving a visual characteristic from the search query based at least in part on information about a field included in the search query.

5. The method of claim 1 wherein ascertaining the one or more visualization characteristics comprises deriving a visualization characteristic from the result produced by executing the search query.

6. The method of claim 1 wherein ascertaining the one or more visualization characteristics comprises deriving a visualization characteristic from the result produced by executing the search query, the deriving including performing a statistical calculation over values for one or more fields in the result.

7. The method of claim 1 wherein ascertaining the one or more visualization characteristics comprises deriving a visualization characteristic from the result produced by executing the search query, the deriving including performing a statistical calculation over values for one or more fields in the result, the statistical calculation including at least one from among sum, count, average, range of values, minimum, maximum, distribution, and standard deviation.

8. The method of claim 1 wherein ascertaining the one or more visualization characteristics comprises evaluating the search query.

9. The method of claim 1 wherein ascertaining the one or more visualization characteristics comprises evaluating the result produced by executing the search query.

10. The method of claim 1 wherein ascertaining the one or more visualization characteristic comprises evaluating the search query and evaluating the result produced by executing the search query.

11. The method of claim 1 wherein ascertaining the one or more visualization characteristics includes deriving a visual characteristic from the search query and deriving a visualization characteristic from the result produced by executing the search query.

12. The method of claim 1 wherein ascertaining the one or more visualization characteristics includes deriving a visual characteristic from a combination of the search query and the result produced by executing the search query.

13. The method of claim 1 further comprising:
causing execution of the search query by an event-based data intake and query system to produce a search result; and
wherein ascertaining the one or more visualization characteristics comprises evaluating the search result.

14. The method of claim 1 wherein determining the set of candidate visualization types comprises comparing one or more visualization characteristics of the search query with one or more visualization attributes of the visualization type.

15. The method of claim 1 wherein determining the set of candidate visualization types comprises matching one or more visualization characteristics of the search query with identical visualization attributes of the visualization type.

16. The method of claim 1 wherein determining the set of candidate visualization types comprises semantically matching one or more visualization characteristics of the search query with one or more visualization attributes of the visualization type.

17. The method of claim 1 wherein determining the set of candidate visualization types comprises comparing one or more visualization characteristics of the search query with one or more visualization attributes of the visualization type and ordering the list.

18. The method of claim 1 wherein determining the set of candidate visualization types comprises comparing one or more visualization characteristics of the search query with one or more visualization attributes of the visualization type and ordering the list based at least in part on the results of the comparing.

19. The method of claim 1 wherein determining the set of candidate visualization types comprises comparing one or more visualization characteristics of the search query with one or more visualization attributes of the visualization type and ordering the list based at least in part on the results of the comparing and on at least one other factor.

20. The method of claim 1 wherein determining the set of candidate visualization types comprises comparing one or more visualization characteristics of the search query with one or more visualization attributes of the visualization type and ordering the list based at least in part on the results of the comparing and on at least one other factor comprising user-specific information.

21. The method of claim 1 wherein determining the set of candidate visualization types comprises comparing one or more visualization characteristics of the search query with one or more visualization attributes of the visualization type and ordering the list based at least in part on the results of the comparing and on at least one other factor comprising user-specific information, the user-specific information comprising at least one of user history information and user preference information.

22. The method of claim 1 wherein each of the visualization types registered with the visualization framework comprises implicitly determined attributes.

23. The method of claim 1 wherein the visualization attributes of the stored definition comprise implicitly determined attributes derived at least in part from the sample search query of the definition.

24. The method of claim 1 wherein the visualization attributes of the stored definition comprise implicitly determined attributes automatically derived at least in part from the sample search query of the definition in response to any one or more of the registration, installation, addition, and update of the stored definition.

25. The method of claim 1 wherein the search query is executable by an event-based data intake and query system.

26. The method of claim 1 wherein the search query is executable by an event-based query system having machine data segments represented as events.

27. The method of claim 1 further comprising:
receiving a selection indication from the portion of the set of candidate visualization types in response to user interaction with the graphical interface; and
causing the display of a visualization of a result of the search query, wherein the type of the visualization accords with the received selection indication.

28. A system comprising:
a memory; and
a processing device coupled with the memory and configured to:
receive a search query entered using a graphical interface, the search query identifying data of active interest to a user and to be visualized;
analyze the search query to ascertain one or more visualization characteristics associated with the search query, wherein each visualization characteristic of the one or more visualization characteristics describes a visualizable aspect of a set of events;
access a set of visualization types registered with a visualization framework, each visualization type of the set of visualization types including a stored characteristics tag component, search component, and code component, wherein the characteristics tag component includes an indicator of a visualization-related characteristic, wherein the search component specifies a sample search query representative of at least a portion of an actual search query that can be executed to provide data to be rendered by a visualization of the visualization type, wherein the sample search query is not used to generate the visualization, and wherein the code component includes instructions for rendering the data into the visualization;

determine a set of candidate visualization types from the set of visualization types, wherein a candidate visualization type is included in the set of candidate visualization types based on a visualization characteristic associated with the search query corresponding to a characteristics tag component included in the candidate visualization type or the search query corresponding to a search component included in the candidate visualization type;

cause the display of a graphical interface that indicates the set of candidate visualization types and enabling user interaction to indicate a selection of a particular visualization type from the set of candidate visualization types.

29. The system of claim 28 wherein the search query comprises text in a search query language.

30. A non-transitory computer readable storage medium having instructions encoded thereon, execution of which by one or more processing devices causes the one or more processing devices to perform operations comprising:

receiving a search query entered using a graphical interface, the search query identifying data of active interest to a user and to be visualized;

analyzing the search query to ascertain one or more visualization characteristics associated with the search query, wherein each said visualization characteristic of the one or more visualization characteristics describes a visualizable aspect of a set of events;

accessing a set of visualization types registered with a visualization framework, each visualization type of the set of visualization types including a stored characteristics tag component, search component, and code component, wherein the characteristics tag component includes an indicator of a visualization-related characteristic, wherein the search component specifies a sample search query representative of at least a portion of an actual search query that can be executed to provide data to be rendered by a visualization of the visualization type, wherein the sample search query is not used to generate the visualization, and wherein the code component includes instructions for rendering the data into the visualization;

determining a set of candidate visualization types from the set of visualization types, wherein a candidate visualization type is included in the set of candidate visualization types based on a visualization characteristic associated with the search query corresponding to a characteristics tag component included in the candidate visualization type or the search query corresponding to a search component included in the candidate visualization type;

causing the display of a graphical interface that indicates the set of candidate visualization types and enabling user interaction to indicate a selection of a particular visualization type from the set of candidate visualization types.

* * * * *